United States Patent [19]
Tallent et al.
[11] 3,900,885
[45] Aug. 19, 1975

[54] TELEVISION SIGNAL TIME BASE CORRECTOR

[75] Inventors: Michael W. Tallent; William B. Hendershot, both of San Jose; Allan L. Swain, Palo Alto; Ronnie M. Harrison, San Jose, all of Calif.

[73] Assignee: Consolidated Video Systems, Santa Clara, Calif.

[22] Filed: May 23, 1974

[21] Appl. No.: 472,761

[52] U.S. Cl. .................... 358/8
[51] Int. Cl. .................... H04n 9/02
[58] Field of Search .................... 358/4, 8; 360/36

[56] References Cited

UNITED STATES PATENTS

| | | | |
|---|---|---|---|
| 3,617,626 | 11/1971 | Bluth et al. | 358/4 |
| 3,716,663 | 2/1973 | Bolger | 358/8 |

*Primary Examiner*—Richard Murray
*Attorney, Agent, or Firm*—Townsend and Townsend

[57] ABSTRACT

A video signal processor for improving the information content of video input signals coupled thereto and capable of operation in several unique distinct modes. In a first mode of operation, the invention produces broadcast quality monochromatic or color video signals from monochromatic or direct input color video signals reproduced by a V-LOCK signal source, e.g., a capstan servo video tape recorder. In another mode of operation, the invention produces broadcast quality direct color video signals from processed color video signals supplied by a V-LOCK video signal source. In another mode of operation, the invention produces monochromatic or color video signals having a substantially reduced time base error from monochromatic or color video signals reproduced by a LINE LOCK video signal source, such as a non-capstan servo video tape recorder. In another mode of operation, the invention produces from processed color video signals supplied by a LINE LOCK source color video signals, termed quasi-direct color signals, which are properly phased so that they may be dubbed up to a quadraplex video tape recorder or a capstan servo video tape recorder and reproduced a second time as broadcast quality direct color video signals.

46 Claims, 13 Drawing Figures

TELEVISION SIGNAL TIME BASE CORRECTOR

BACKGROUND OF THE INVENTION

1. Field of the Invention

This invention relates to the processing of video signals to improve the information content thereof. More particularly, this invention relates to the processing of video signals to remove time base errors introduced during signal recording, reproducing or transmission and also to prepare certain types of video signals for reproduction as broadcast quality video.

2. Definitions

Several terms used in the following specification have acquired the status of terms of art in the television industry. These terms are as follows:

DIRECT COLOR

Color video signals having a color reference frequency $f_c$ and horizontal sync frequency $H$ related in such a manner that $f_c = 227.5H = 3.579545 \times 10^6$ HZ, with successive lines having color burst with a phase difference of 180°.

PROCESSED COLOR

Color video signals having $f_c$ and $H$ which do not comply with phase and frequency requirements serving to define direct color. Alternative known terms for processed color are heterodyned or non-phased color.

V-LOCK SOURCE

A source of video signals having a timing signal train which is ordinarily phase locked to an external generator, such as a capstan servo recorder having a clock signal train phase locked to a vertical sync signal train supplied by a T.V. studio timing generator.

LINE-LOCK SOURCE

A source of video signals having a timing signal train which is controlled by an internally generated reference signal, such as a non-capstan servo recorder having a timing signal train controlled by a synchronous motor.

DESCRIPTION OF THE PRIOR ART

In the art of television broadcasting, television signals are frequently recorded on magnetic tape and subsequently reproduced for later broadcasting or viewing purposes.

Video tape recorders used for this purpose generally fall into one of two categories: capstan servo recorders or non-capstan servo recorders. The former are characterized by a synchronizing scheme in which the recorder is locked to an external reference frequency provided by a standard frequency generator ordinarily located in the television broadcast studio, and thus operate as a V-LOCK source; the latter are characterized by a synchronizing scheme in which the recorder is synchronized by an internally generated reference frequency, and thus operate as a LINE-LOCK source.

In many cases, pre-recorded television program material must be mixed with live broadcast material; in other instances, e.g., during studio previewing or home viewing, the pre-recorded information signals are viewed without mixing. In all cases, due to the time dependent nature of television signals, care must be taken to avoid the introduction of time base errors when reproducing cause pre-recorded television material since such time base errors cuse a frequency shift of the reproduced signals which can result in many observable undesirable effects.

During the reproduction of recorded video signals by either type of video tape recorder, however, frequency errors are usually introduced by several factors. These factors include expansion or contraction of the recording medium during or after recording, variation in the speed of the tape past the tape head during recording or reproduction, variance between the tape recording speed and the tape reproduction speed (even though each speed is substantially constant) and the like. Thus, due to the limitations inherent in recording or reproducing systems utilizing mechanical elements, and the relatively high frequencies involved in television signals, all known video tape recorders introduce such time base errors. Such errors can also be introduced by other devices employed in the transmission of television signals. If these signals are employed without further processing as the input to a video receiver or other follow-on device, a degraded picture is reproduced, the degradation usually appearing when small time base errors are involved as a smeared or jittery picture with erroneous intensity variations and, in the case of color video signals, improper color display. When the time base errors are great, the picture will fail to lock horizontally or vertically. Accordingly, the reproduced television signals must be electronically processed to minimize time base errors.

Time base correctors are known which are employed for the purpose of minimizing such time base errors from television video signals. These time base correctors customarily employ tapped delay lines, or other variable delay elements, for introducing variable delay in the incoming video signals in order to compensate in an analog fashion for the undesired frequency variations in the input signals.

Known time base correctors suffer from several disadvantages. Some are compatible with only particular types of video tape recorder. Such time base correctors require the concurrent use of a specific type of video tape recorder which may not be well adapted for the user's overall requirements. Other known time base correctors are compatible with several types of video tape recorders, but are extremely expensive to manufacture and require frequent calibration, thereby requiring extensive maintenance costs.

Many time base correctors suffer from the extreme disadvantage of affording only an extremely narrow useful correction range, typically in the order of ± 2.2 microseconds. Since the length of a standard NTSC single line of television information is approximately 63.56 microseconds, such devices are only capable of removing minor time base errors. In commonly assigned co-pending patent application, Ser. No. 381,463 for TELEVISION SIGNAL TIME BASE CORRECTOR, filed July 23, 1973, now U.S. Patent No. 3,860,952 issued Jan. 14, 1975, the disclosure of which is hereby incorporated by reference, a video time base corrector is disclosed which provides an exceedingly wide correction window of ±1.5 lines of video information, i.e., ±95.34 microseconds and which is capable of processing video signals reproduced by a capstan servo video tape recorder to provide broadcast quality monochromatic or color video signals. Proper operation of this time base corrector is predicated on the fact that the color video output signals from a capstan servo recorder, while containing time base errors, are properly phased line-by-line, i.e., such input signals conform with the NTSC definition of direct color that alternate lines contain color burst with a phase difference of 180°. Color video signals reproduced by non-capstan servo recorders typically do not meet this standard, and, accordingly, are incompatible with the above-noted time base corrector. Efforts to provide a satisfactory video time base corrector affording a correction window having the order of magnitude noted above for video signals reproduced by non-capstan servo recorders as well as capstan servo recorders have not met with wide success to date.

SUMMARY OF THE INVENTION

The invention comprises a video signal processor which is relatively inexpensive to manufacture and maintain, which is compatible with both capstan servo and non-capstan servo video tape recorders, which affords an extremely wide useful correction range of ± 1.5 lines of video information (i.e., ± 95.34 microseconds), and which is capable of operation in several distinct modes, many of which have been heretofore unattainable with known devices. In a first mode of operation, the preferred embodiment of the invention is capable of producing broadcast quality monochromatic or color video signals from monochromatic or direct input color video signals reproduced by a capstan servo video tape recorder and containing time base errors of a magnitude coextensive with the above-stated correction range. In an alternate mode of operation, the invention is capable of producing broadcast quality direct color video signals from processed color video signals reproduced by a capstan servo video tape recorder. In another mode of operation, the invention is capable of producing monochromatic or color video signals with a substantially reduced time base error from monochromatic or color video signals reproduced by a non-capstan servo video tape recorder. In still another mode of operation, the invention is capable of producing from processed color video signals reproduced by a non-capstan servo video tape recorder, color video signals which are properly phased so that they may be dubbed up to a quadraplex video tape recorder or a capstan servo video tape recorder and reproduced a second time as broadcast quality direct color video signals.

In the preferred embodiment, incoming video information is converted from analog to digital form and stored temporarily in a memory unit. The sampling and clocking signals for storing the digitized information are derived from an input phase lock loop which includes a voltage controlled oscillator whose frequency is dependent upon the frequency content of the instantaneous video line of information being stored. After storage, the digitized time base corrected video information is clocked out from the memory unit, reconverted to analog form, processed and furnished to an output terminal for use with appropriate follow-on devices.

The input phase lock loop includes a first coarse loop controlled by the frequency of successive horizontal sync pulses in the incoming video signal, and a second fine phase lock loop controlled by the color burst frequency of the burst portion of successive lines of video information when the input video signals are direct color video signals. Frequency deviations in the incoming signals are converted to error voltages, which are summed and used to control the frequency of the voltage controlled oscillator.

The memory unit comprises a plurality of individual memories, each capable of storing a plurality of horizontal lines of video information. A sequence control unit controls the selection of each memory for writing and reading in such a manner that double clocking of a single memory which marginally occurs at the extreme boundaries of the correction range is quickly relieved.

The signals for clocking the digitized information out from the memory unit are generated by an output phase lock loop which is driven by an output subcarrier frequency $f_{sc}$ obtained from either an internal or an external color frequency standard when the system is operating in a first mode, termed V-LOCK; and which generates clocking signals which are phase locked to the vertical sync portions of the uncorrected input video signals when the system is operating in a second mode, termed LINE LOCK. Various sync signals obtained from either the internal sync generator or an associated studio sync generator are coupled to a processor amplifier in which the sync signals are added to the time base corrected video information signals.

A color processor unit is provided for removing hue phase variations by decoding processed color video signals after time base correction, using the instantaneous frequency of the burst portion of successive lines of processed color video information, and by re-encoding these signals, using the above-noted output subcarrier frequency $f_{sc}$ when the system is operating in PROCESS color mode or using a variable subcarrier frequency when the system is operating in a special mode, termed INTERLACE.

For a fuller understanding of the nature and advantages of the invention, reference should be had to the ensuing detailed description taken in conjunction with the accompanying drawings.

DESCRIPTION OF THE PREFERRED EMBODIMENT

Figure 1:
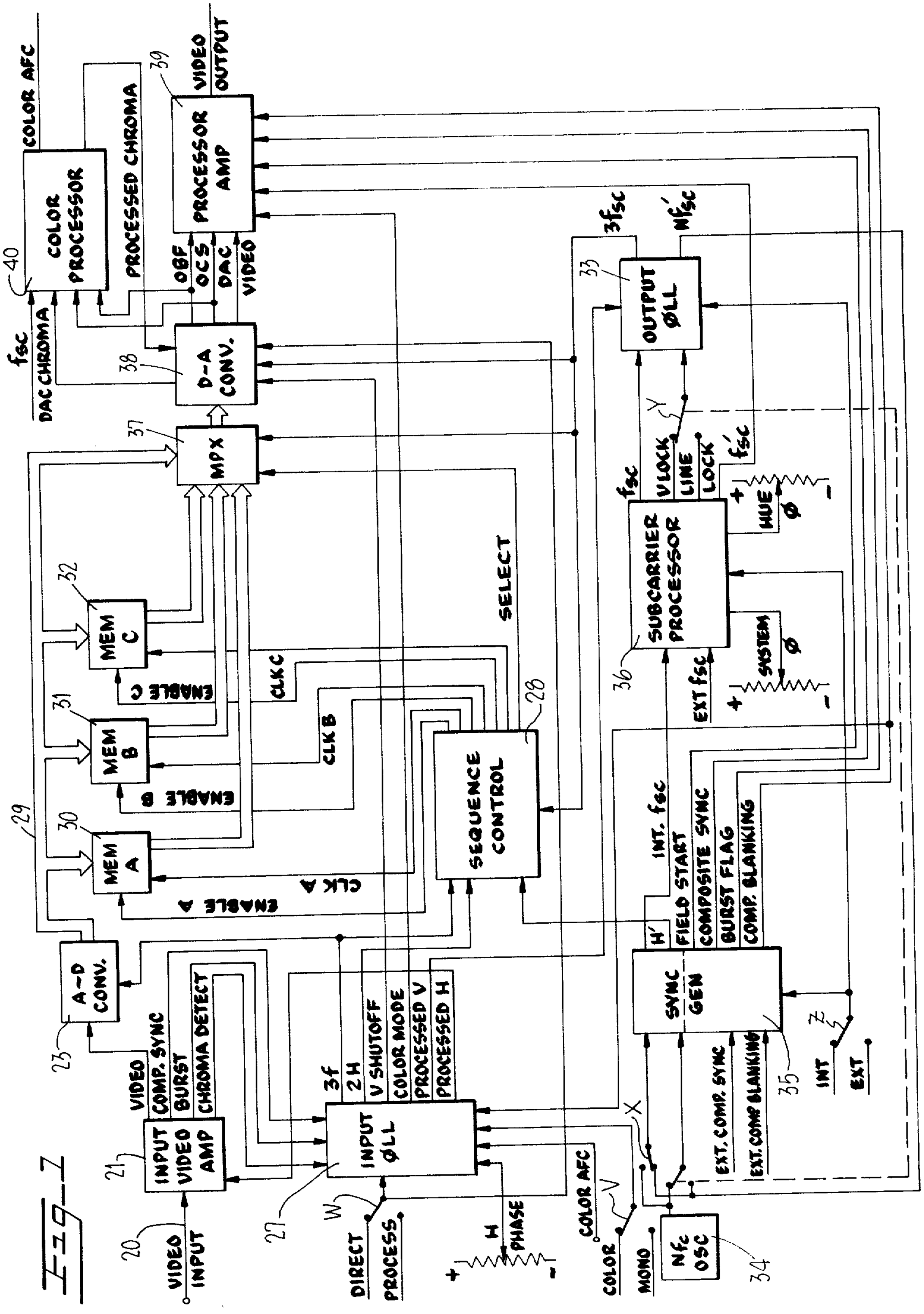
FIG. 1 is a schematic block diagram of the preferred embodiment of the invention.

Turning now to the drawings, FIG. 1 is a system diagram of the preferred embodiment of the invention.

Before proceeding wth a detailed description of the FIG. 1 embodiment, brief consideration of the general operating principles of the invention will facilitate an understanding of the manner in which the various types of input video signals described below are processed according to the invention. All incoming video signals are converted line by line from analog to digital form, temporarily stored in a memory unit, reconverted from digital to analog form and processed to improve the information content of the reconverted analog signals. Time base correction is achieved by sampling and storing each line of video at a first rate, and reading the digital signals out from memory at a second rate. The sampling and storing rate varies in accordance with the frequency content of the uncorrected video signals; the reading rate is either constant or varies at a rate determined by low frequency variations in the uncorrected input signal, depending on whether the incoming video signals are received from a V-LOCK or a LINE LOCK source.

This may best be illustrated by the following examples. Incoming uncorrected video signals obtained from a V-LOCK source are sampled and stored at a variable rate and read out from memory at a constant rate. The incoming uncorrected video signals from a LINE LOCK source are sampled and stored at a variable rate and read out from memory at a variable rate. For V-LOCK source generated signals, the variable sample and store rate is controlled by both the repetition rate of the horizontal sync pulses and also the burst frequency of successive lines of color video, unless the input signals are monochromatic or of the processed color type. In this latter case, the sample and store rate is controlled by the repetition rate of the horizontal sync pulses alone. For LINE LOCK source signals, the variable sample and store rate is controlled by the repetition rate of horizontal sync pulses, regardless of whether the signals are color or monochromatic, while the variable reading rate is controlled by the repetition rate of vertical sync pulse portions of the incoming signals. The system configuration and operation of the FIG. 1 embodiment will now be described.

Video input signals are coupled from an associated video tape recorder or other source of video signals via an input terminal 20 to a conventional input video amplifier 21. Input video amplifier 21 is a conventional circuit having a video detector/separator, a sync stripper, a burst separator and a chroma detector. The video signals output from amplifier 21 are coupled to the input of an analog-to-digital converter 23 shown in detail in FIG. 4. The composite sync, burst and chroma detect signals are coupled to individual input terminals of an input phase lock loop 27 shown in detail in FIG. 2. Input phase lock loop 27 generates high frequency sample and store signals from the signals input thereto, corrected in accordance with the frequency deviations in the input video signals in the manner described below. The sample signals are coupled to analog-to-digital converter 23 for controlling the rate at which incoming video signals are sampled. The store signals are coupled to sequence control unit 28 for use as a reference clock rate signal for storing the sampled portions of the video signals in the memory unit described below. In the preferred embodiment, the frequency of the sample and store signals generated by input phase lock loop 27 is approximately $3f_c$ where $f_c$ is the standard color burst frequency, it being remembered that the instantaneous frequency of the sample and store signals is a function of the time base errors in the video signals. Other multiples $M/N$ ($M$, $N$. both integers) $f_c$ may be employed for this purpose, if desired. Input phase lock loop 27 also generates several reference signals designated PROCESSED $H$, $2H$, PROCESSED $V$, $V$ SHUTOFF and COLOR MODE, which are coupled respectively to input video amplifier 21, sequence control unit 28, an output phase lock loop 33, a digital-to-analog converter 38 and a processor amplifier 39, all for purposes to be described below.

The digitized video signals are coupled via a data bus 29 from analog-to-digital converter 23 to three separate memory units, 30, 31, 32 and also directly to a data multiplexer 37. Memory units 30–32 are controlled by sequence control unit 28 by a plurality of mode control signals ENABLE A, ENABLE B, ENABLE C and clock signals CLOCK A, CLOCK B, CLOCK C.

Multiplexer 37 is controlled by SELECT signals generated by sequence control unit 28 which condition multiplexer 37 to accept information at one of the four possible data inputs, viz. from one of memory units 30–32 or directly from analog-to-digital converter 23. In the preferred embodiment, each memory unit 30–32 comprises an 8 bit by 2,048 word serial shift register with separate clock and enable inputs capable of operation at high frequencies. Each memory unit is clocked at approximately $3f_c$ (10.7 MHZ), which provides a storage capacity of about three complete lines of video information per unit. If desired, other memory configurations may be employed without departing from the spirit of the invention. In addition, shift registers having different line storage capacities may be similarly employed.

Sampled video information is sequentially stored by cyclically enabling memory units 30–32 and serially storing three lines of digitized video information in each selected memory unit. For example, assuming the three most recently sampled lines of digitized video information were serially written into memory unit 30, sequence control unit 28 next enables memory unit 31 for storage of the next succeeding three lines of information, after which memory unit 32 is enabled, then memory unit 30, etc.

Contemporaneously with the storage of sampled video information into a selected memory unit, sequence control unit 28 enables the video information stored in a different memory unit to be sequentially fetched to data multiplexer 37. Stored information is sequentially fetched in a manner similar to the store operation, viz. by cylically enabling memory units 30–32 and sequentially fetching the three lines of video information from each enabled memory unit. As noted below, sequence control unit 28 is provided with means for resetting the contemporaneous read and write operation whenever the time base error in the incoming video signals is so gross as to require reading and writing from the same memory unit.

As noted above, during the write operation the clock signals supplied by sequence control unit 28 to memory units 30–32 are derived from the 3f signals generated by input phase lock loop 27. During the read operation, the clock signals supplied by sequence control unit 28 are derived from a different reference signal $3f_{sc}$, generated by an output phase lock loop 33 illustrated in detail in FIG. 9. Output phase lock loop 33 generates the $3f_{sc}$ signals derived from either (a) a reference signal $f_{sc}$ supplied thereto, or (b) vertical sync portions of the uncorrected input video signals, depending on the selected mode of operation.

A conventional high frequency crystal controlled oscillator 34 generates a frequency standard signal $Nf_c$ ($N$ an integer), which in the preferred embodiment is $4f_c$. This clock signal is coupled via a switch X (shown in an alternate INTERLACE position) to the color subcarrier reference frequency input of a conventional video sync generator 35, which in the preferred embodiment is a Fairchild Type 3261 TV Sync Generator. Sync generator 35 has three additional reference signal inputs coupled respectively to the blade of a switch Y, for a purpose described below, and to composite sync and composite blanking signals obtained from an external sync generator, such as a conventional studio sync generator. Sync generator 35 is also provided wth a mode control input coupled to the moveable blade of a switch Z for selecting internal sync or external sync as described more fully below.

Sync generator 35 provides a plurality of reference signals which are coupled to several sub-units of the preferred embodiment in the following manner. A reference signal H', which is a periodic signal having a frequency equal to or close to the frequency of standard horizontal sync pulses, is coupled to an input terminal of sequence control unit 28 for providing a reference signal for switching memories 30–32 during the read portion of the system operation. A color frequency standard termed INTERNAL $f_{sc}$ is coupled to a first input terminal of a subcarrier processor unit 36, illustrated in detail in FIG. 8, for a purpose to be described. A FIELD START reference signal, which is a signal having a frequency of about 60 HZ, is coupled to an input terminal of output phase lock loop 33. COMPOSITE SYNC, BURST FLAG, and COMPOSITE BLANKING signals are all coupled to individual input terminals of processor amplifier 39. In addition, COMPOSITE BLANKING signals are coupled to an input terminal of input phase lock loop 27 for a purpose to be described.

Subcarrier processor unit 36 has an additional reference signal input to which an external subcarrier EXT $f_{sc}$ is supplied, and a pair of phase control inputs coupled to a pair of manually adjustable controls labeled SYSTEM PHASE and HUE PHASE, all for a purpose to be described. The output of switch Z is also coupled to a mode control input of subcarrier processor unit 36. Subcarrier processor unit 36 generates a pair of output reference signals: a first, labeled $f_{sc}$, is coupled to a first reference frequency input terminal of output phase lock loop 33 and also to an input of a color processor unit 40; a second labeled $f'_{sc}$ is coupled to a separate input terminal of processor amplifier 39.

Output phase lock loop 33 is provided with a mode control input which is coupled to a second blade of switch Y for a purpose to be described. Output phase lock loop 33 generates a pair of reference signals: a first, termed $3f_{sc}$ is coupled to the read clock input of sequence control unit 28, a sample input of multiplexer 37 and a sample input of a digital-to-analog converter unit 38 shown in detail in FIG. 11. A second, labeled $Nf_{sc}$ is coupled to the LINE LOCK terminal of switch Y for a purpose to be described.

The digital video information signals fetched line-by-line from memory units 30–32, or coupled directly from analog-to-digital converter 23 to data multiplexer 37, are processed therein in the manner noted below and coupled to the input of digital-to-analog converter unit 38. Digital-to-analog converter unit 38 is provided with a mode control input coupled to a switch W which controls the operation of this unit in the manner described below. Digital-to-analog converter 38 furnishes three output signals, OUTPUT BURST FLAG, OUTPUT COMPOSITE SYNC and VIDEO, hereinafter abbreviated as OBF, OCS, and DAC VIDEO, which are coupled to individual input terminals of processor amplifier 39. OBF and OCA signals are additionally coupled to individual input terminals of color processor unit 40 shown in detail in FIG. 12. In addition, digital-to-analog converter unit 38 furnishes an additional signal, termed DAC CHROMA, to a separate input terminal of color processor unit 40. Color processor unit 40 has a further input terminal to which reference signals $f_{sc}$ are coupled from subcarrier processor 36. Color processor unit 40 generates two output signals: a first, termed PROCESSED CHROMA is coupled back to digital-to-analog converter unit 38; a second, termed COLOR AFC is coupled to a separate input of input phase lock loop 27.

INPUT PHASE LOCK LOOP 27

Figures 2, 3:
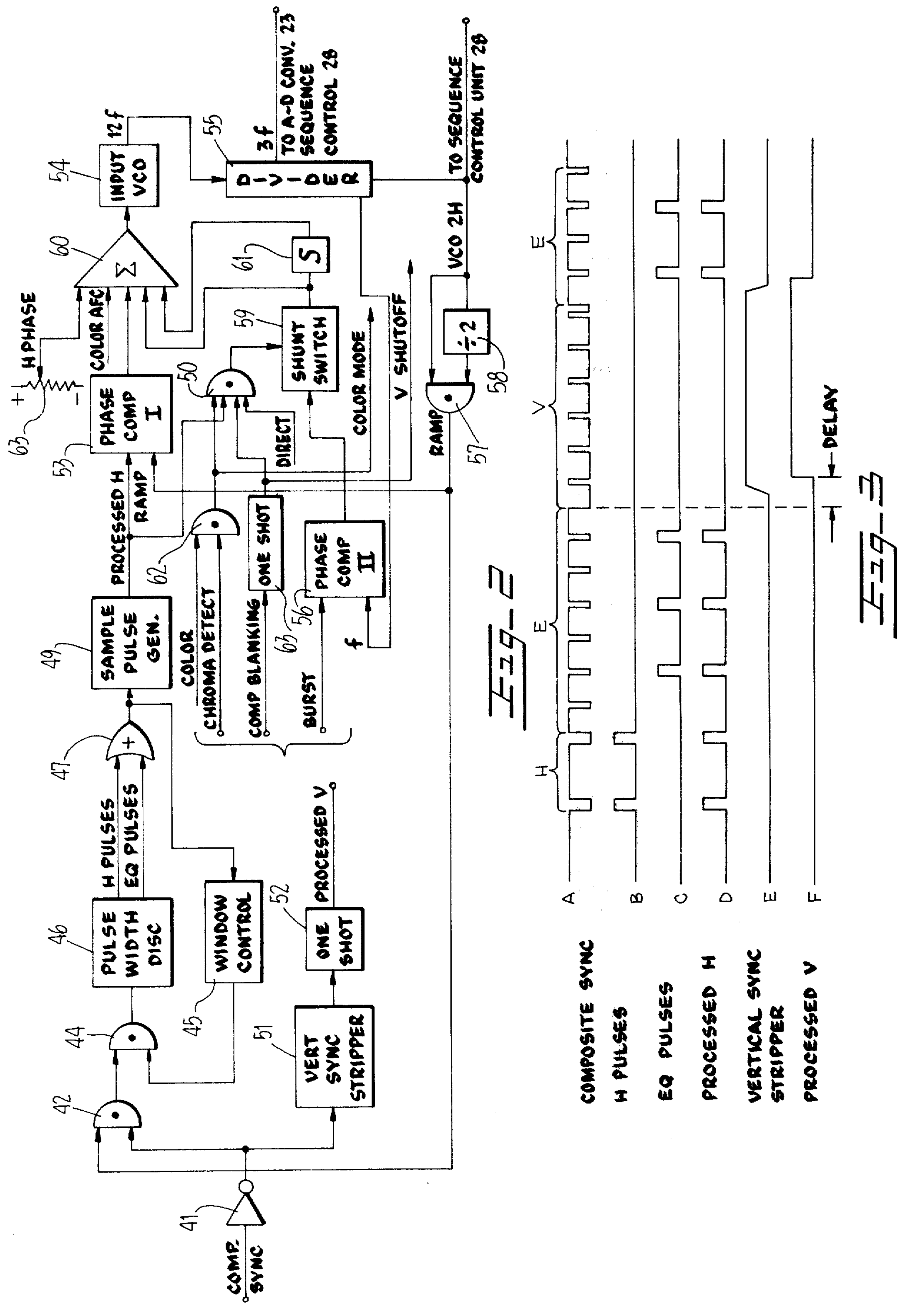
FIG. 2 is a schematic diagram illustrating the input phase lock loop.
FIG. 3 is a waveform diagram illustrating the operation of a portion of the input phase lock loop of FIG. 2.

With reference to FIG. 2, composite sync signals from input video amplifier 21 are coupled via an inverter 41 to a first input of an AND gate 42. The output of AND gate 42 is coupled to a first input of an AND gate 44, the remaining input to which is the output of a window control unit 45, described below. The output of AND gate 44 is coupled to the input of a conventional dual pulse width discriminator 46 comprising conventional pulse width discriminating circuits for recognizing horizontal sync pulses lying in the range of about 4.2 to about 5.4 microseconds and equalizer pulses lying in the range from about 2.0 to about 2.7 microseconds. The outputs of dual pulse width discriminator 46, which comprise either valid horizontal sync pulses or valid equalizer pulses, are coupled via an OR gate 47 to the input of a sample pulse generator 49 and the input of window control unit 45. Sample pulse generator 49 is a conventional pulse generator circuit which generates a 3 microseconds wide sample pulse for each pulse input thereto. The output of sample pulse generator 49, termed PROCESSED H, is coupled to a first input of a first phase comparator 53, and also to an input of an AND gate 50.

Window control unit 45 is a conventional delayed pulse generator which generates a train of six microsecond wide pulses centered about the expected arrival time of incoming horizontal sync pulses. In addition, this unit is provided with an internal disable time out circuit which is operative approximately 80 microseconds from the time of the last sample. Thus, if a horizontal sync pulse is not recognized by pulse width discriminator unit 46 within 80 microseconds from the last pulse so recognized, window control unit 45 is automatically disabled until the next pulse is received.

Composite sync is also coupled via inverter 41 to the input of a conventional vertical sync stripper 51. The output of vertical sync stripper 51 is coupled to the input of a one shot 52, the output of which is termed PROCESSED V, and as noted above, is coupled to the outuput phase lock loop 33.

The operation of elements 44, 45, 46, 47, and 49 in response to the receipt of noiseless and noisy horizontal sync pulses, the absence of horizontal sync pulses, and the receipt of displaced horizontal sync pulses lying outside the 6 microsecond wide window is described in detail in the aforementioned co-pending patent application, Ser. No. 381,463, and, accordingly, will not be repeated in detail herein. Briefly, these elements remove any noise lying outside the 6 microsecond range from incoming horizontal sync pulses, and generate uniform PROCESSED H pulses having a uniform width of three microseconds for each vaid horizontal sync pulse received. In addition, when a horizontal sync pulse is missing or is displaced to such an extent that it lies outside the 6 microsecond wide window provided by window control unit 45, the 6 microsecond mask is removed approximately 80microseconds after the previously received pulse so that the next succeeding horizontal sync pulse need only meet the criterion of a 15 microsecond window provided by a RAMP signal, described below.

Waveforms A–F shown in FIG. 3 illustrate the operation of the above-noted elements and elements 51, 52 in response to the receipt of horizontal sync pulses, equalizer pulses and vertical sync pulses. For economy of space, the time scale of these waveforms is greatly compressed. In waveform A, a train of pulses is illustrated which comprises horizontal sync pulses H, equalizer pulses E and vertical sync pulses V. Waveform B illustrates the output of discriminator 46 in response to the receipt of successive horizontal sync pulses. Waveform C illustrates the output of discriminator 46 in response to the receipt of successive equalizer pulses. It is noted that discriminator 46 detects only those alternate equalizer pulses which occur with substantially the same frequency as the horizontal sync pulses. Waveform D illustrates the output of sample pulse generator 49 in response to the receipt of waveforms B and C. It is noted that PROCESSED H, the output of sample pulse generator 49, comprises pulses of uniform width generated in response to both horizontal sync pulses and equalizer pulses. It is further noted that vertical sync pulses are screened out and do not appear in PROCESSED H. Waveform E illustrates the output of vertical sync stripper 51 in response to the receipt of vertical sync pulses. Waveform F illustrates the output of one shot 52, termed PROCESSED V, in response to the receipt of an output signal from vertical sync stripper 51. It is noted that one shot 52 provides a delay, preferably about 450 microseconds, which compensates for internal delays in the passage of the video signals through the memory portion of the system, it being remembered that PROCESSED V is used as a reference signal for output phase lock loop 33 which operates on the output side of the memory portion.

Returning to FIG. 2, input phase lock loop 27 further includes a voltage controlled oscillator 54 which, in the absence of a control signal at the input thereto, generates a signal train having a frequency $12f_c$. The output of voltage controlled oscillator 54 is coupled to the input of a conventional divider circuit 55 which divides the $12f$ signal input thereto down to a first reference signal having a frequency $3f$ which is coupled to analog-to-digital converter 23 and sequence control unit 28; a second reference signal having a frequency $f$, which is coupled to a first input of a second phase comparator 56; and a third reference signal having a frequency $2H$ which is coupled to sequence control unit 28, and is also coupled directly to a first input of an AND gate 57 and indirectly via a conventional divide-by-two circuit 58 to the remaining input of AND gate 57. The output of AND gate 57, designated RAMP, which is a 15 microseconds wide periodic pulse train, is coupled to the remaining input of AND gate 42 and the remaining input of first phase comparator 53.

Phase comparator 53 and phase comparator 56 are both conventional units for providing an output control signal whose magnitude varies with the phase difference between the two input signals thereto. In addition, phase comparators 53, 56 are both provided with an internal sample and hold circuit which retains the correction voltage between successive phase comparisons, i.e., in the period between successively received PROCESSED H pulses in the case of comparator 53, and color burst from successive video lines in the case of comparator 56.

As noted above, $f$ reference signal is coupled from divider 55 to a first input of phase comparator 56. The remaining input to phase comparator 56 comprises the color burst signals received from input video amplifier 21. Thus, phase comparator 56 provides a DC correction voltage whose magnitude varies in accordance with the phase difference between the two input signals. The output of phase comparator 56 is coupled to the input of a conventional shunt switch 59. The output of shunt switch 59 is coupled directly to a separate input of summing amplifier 60 and also to the input of a conventional integrator circuit 61, the output of which is also coupled to a separate input of summing amplifier 60.

Shunt switch 59 is provided with a control input which is coupled to the output of AND gates 50. The inputs to AND gate 50 are PROCESSED H, the output of an AND gate 62, DIRECT control signal from switch W (FIG. 7), and the output of a one shot 63. The input signals to AND gate 62 are COLOR control signal from switch V (FIG. 1) and CHROMA DETECT control switch supplied by input video amplifier 21. One shot 63 is a conventional unit responsive to horizontal sync and equalizer pulses, but not vertical sync pulses, for generating an enabling signal at the output thereof which conditions AND gate 50. The output of one shot 63, termed VERTICAL SHUTOFF, is also coupled to digital-to-analog converter 38 for the purpose described below.

Whenever all signals are present at the input to AND gate 50 and the composite blanking signals generated by sync generator 35 do not represent vertical blanking intervals, any error signal from phase comparator 56 is coupled through shunt switch 59 to elements 60, 61. Conversely, when any one of the signals input to AND gate 50 are absent, or when the composite blanking signals input to one shot 63 represent vertical blanking intervals, any error voltage from the output of phase comparator 56 is shunted to ground.

In addition to the signals noted above, summing amplifier 60 is provided with a horizontal phase calibration signal obtained from a manually adjustable variable resistance 63 and COLOR AFC reference signals obtained from color processor 40 (FIG. 1). The former signals facilitate initial system set-up; the latter provide improved stability to the phase lock loop when the system is operated in PROCESS color mode in the manner described below.

In operation, in the absence of any time base error in the incoming video signal, voltage controlled oscillator 54 generates a $12f_c$ signal train. This signal train is divided down by divider 55 to provide the $3f_c$ (10.7 MHZ) sample and store signals to units 23, 28, the $f_c$ (3.58 MHZ) signals to phase comparator 56 and VCO 2H reference signals at the rate of 31.47 KHZ. The VCO 2H reference signals are processed by divide-by-two circuit 58 and AND gate 57 to produce the RAMP signal, which comprises a 15 microsecond wide square wave train centered about the expected arrival time of successive horizontal sync pulses. Calibration of the input VCO unit is achieved empirically by injecting a standard video test pattern into the system and adjusting potentiometer 63 while observing the video output of the unit on a suitable test instrument, (e.g., an oscilloscope) until the horizontal sync portion of the video output appears in standard form. Once adjusted, the properly phase RAMP signal provides a 15 microsecond wide window for the pulse discriminator portion of input phase lock loop 27, and also serves as a reference input to phase comparator 53. In the absence of any time base errors in the incoming video signals, neither phase comparator 53 nor phase comparator 56 produces a correction voltage, and voltage controlled oscillator 54 continues to generate the signal train $12f_c$.

If the incoming video signal contains time base errors, the phase difference between PROCESSED H and RAMP signals causes phase comparator 53 to produce a first correction voltage which is coupled via summing amplifier 60 to the control voltage input of voltage controlled oscillator 54. In addition, if the system is operating in DIRECT color mode, denoted by the presence of COLOR signal at the input to AND gate 62 and DIRECT signal at the input to AND gate 50 any phase difference between the color burst signal and the $f_c$ reference signal from divider 55 causes phase comparator 56 to produce a correction voltage at the output thereof which is coupled via shunt switch 59 to summing amplifier 60 and to the input of integrator 61. It will be remembered that the operation of shunt switch 59 is controlled by the gate signal from AND gate 50, which is controlled by the output of AND gate 62, one shot 63 and DIRECT signal. Thus, if the color portion of the input video signal lies below a predetermined threshold (CHROMA DETECT absent), or composite blanking fails to trigger one-shot 63, or the system is adjusted for processed color input video signals (DIRECT absent), or the system is adjusted for monochromatic input video signals (COLOR absent), shunt switch 59 shunts the error voltage from the output of phase comparator 56 so that voltage controlled oscillator 54 is not affected thereby. In the absence of a disable signal, the correction voltage resulting from phase differences in the color portion of the signal is coupled to the control voltage input of voltage controlled oscillator 54 and is also integrated over a period of several lines by integrator 61.

Receipt of the control voltage signal by the voltage controlled oscillator 54 causes the frequency of the output signal to shift from $12f_c$ to a different frequency $12f$ in order to compensate for the detected phase differences. This change in frequency is reflected in the various output signals from divider 55.

In summary, input phase lock loop 27 includes two phase correction loops for adjusting the frequency of input voltage controlled oscillator 54. The first, or H, loop provides a coarse correction which compensates for large time base errors. A second, or fine, loop provides a fine correction which compensates for small time base errors. In addition, the fine loop integrator 61 provides a time averaged correction voltage, averaged over several lines of video, which compensates for random 180° color phase lock errors. Lastly, it is noted that the second loop is only active during the receipt of direct color signals during horizontal blanking portions of each field of video information received.

ANALOG-TO-DIGITAL CONVERTER

Figure 4:
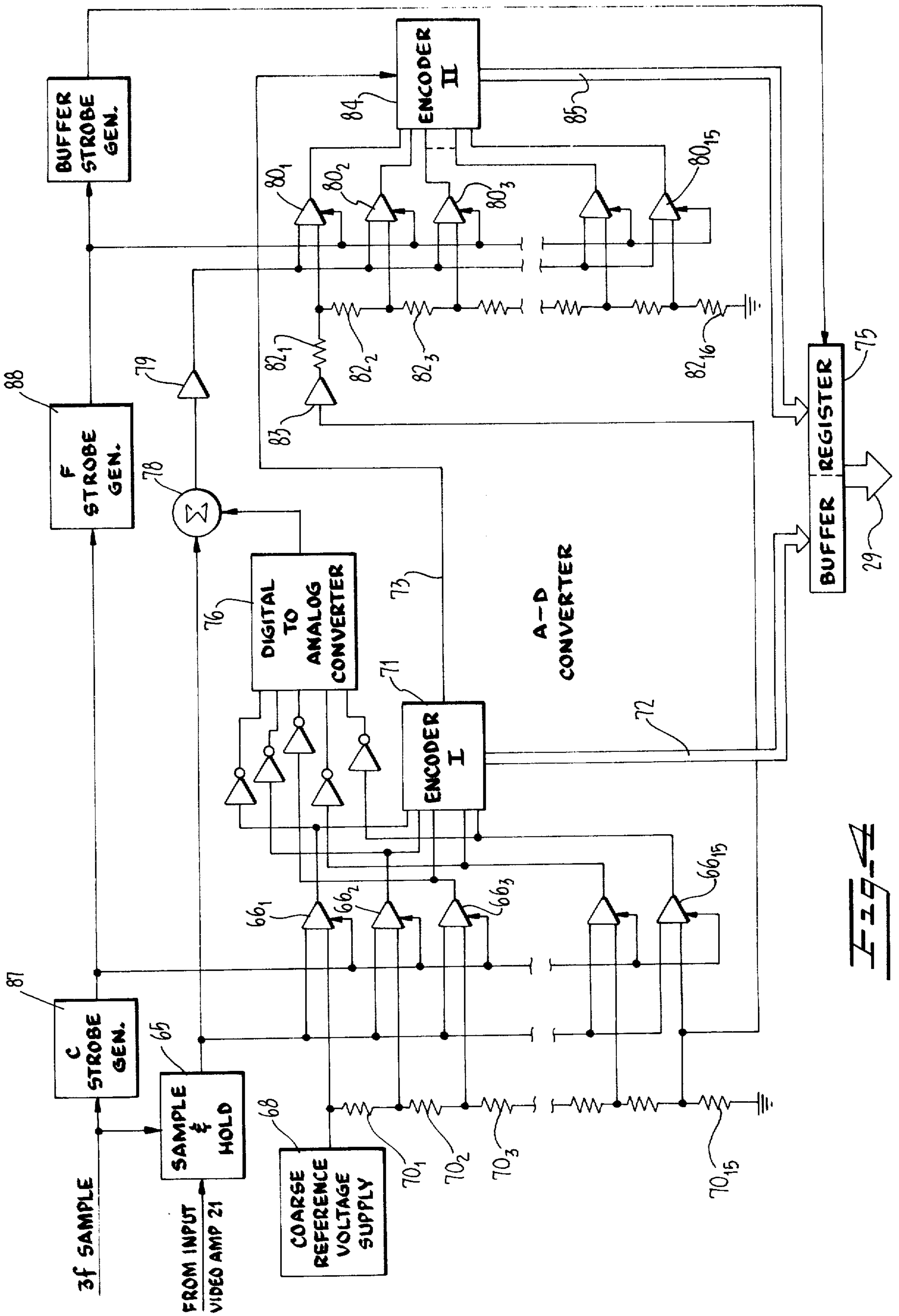
FIG. 4 is a schematic diagram illustrating the analog to digital converter.

Analog-to-digital converter 23, shown in FIG. 4, is described in detail in the aforementioned referenced patent application. To avoid prolixity, a detailed discussion of the construction and operation of the unit is omitted from this specification. Briefly, analog-to-digital converter 23 is a parallel-serial converter which converts each sampled portion of the incoming analog video information into an 8 bit Grey code digital character. Each sampled portion is converted to a digital character in two 4-bit parallel conversions which occur serially. The analog video input signals are sampled at the rate $3f$ in response to the receipt of each sample pulse from input phase lock loop 27.

SEQUENCE CONTROL UNIT

Figure 5:
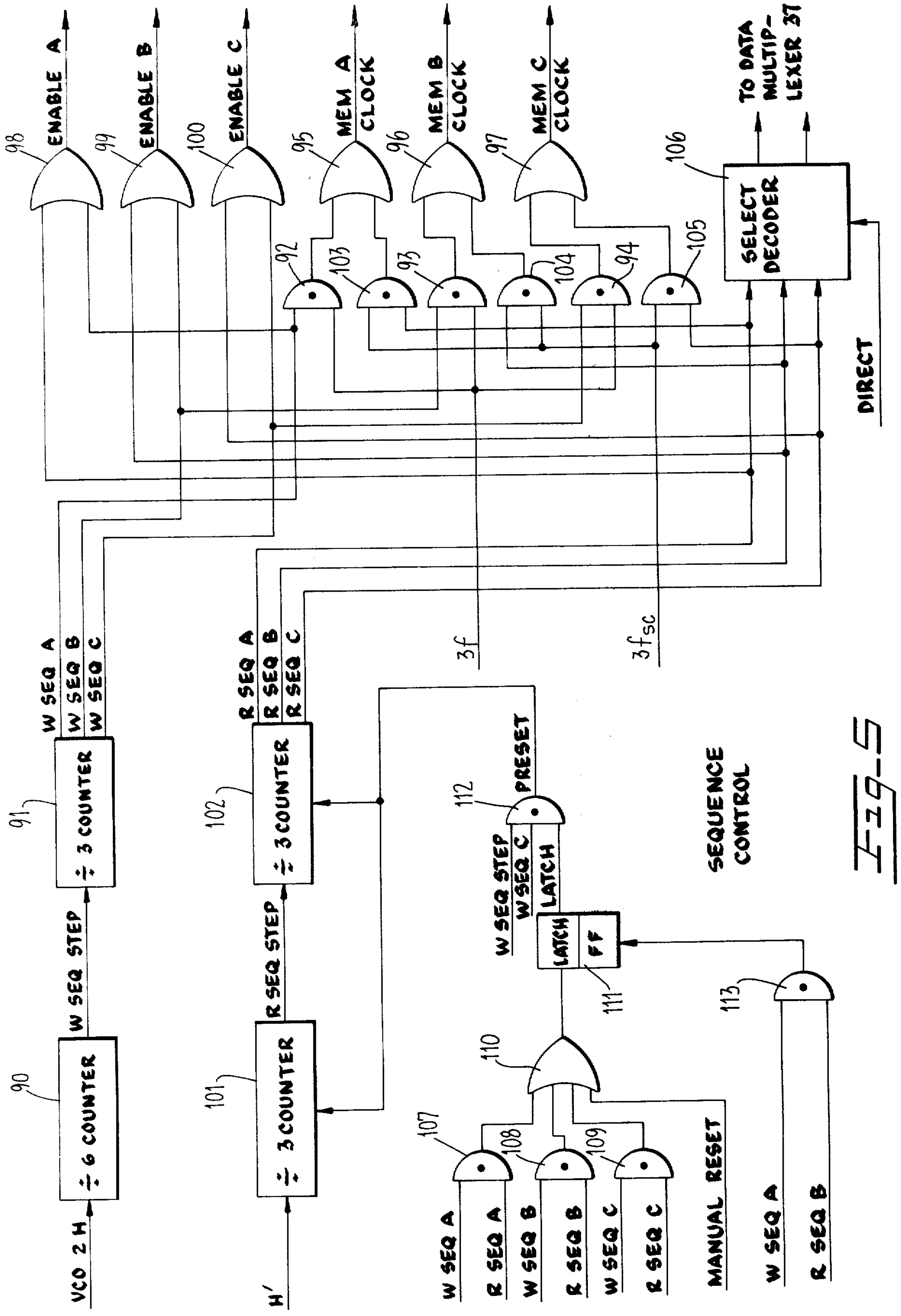
FIG. 5 is a schematic diagram illustrating the sequence control unit.

Sequence control unit 28 is illustrated in FIG. 5. VCO 2H pulses are coupled to the input of a conventional divide-by-six counter 90 which generates a pulse termed W SEQ STEP for each three lines of video information. Successive W SEQ STEP pulses are coupled to a conventional divide-by-three counter 91. The three stages of divide-by-three counter 91 are tapped to provide three enabling signals termed W SEQ A, W SEQ B, and W SEQ C. These three signals are each coupled to a different first input of three separate AND gates 92–94. The other inputs to each of AND gates 92–94 is a $3f_c$ signal obtained from input VCO circuit 27. The outputs of AND gates 92–94 are coupled through three separate OR gates 95, 96, 97 to the clock inputs of memory units 30-32 respectively. W SEQ A, W SEQ B and W SEQ C signals are also coupled to a first input of a different one of three OR gates 90–100, respectively, the outputs of which provide the ENABLE A, ENABLE B and ENABLE C control signals for memory units 30–32.

H' pulse signals from sync generator 35 are coupled to the input of a conventional divide-by-three counter 101 which produces an output signal pulse for each third horizontal line of video information, termed R SEQ STEP. The R SEQ STEP pulses are coupled to the input of a conventional divided-by-three counter 102. The three stages of divide-by-three counter 102 are tapped to provide three enabling signals termed R SEQ A, R SEQ B and R SEQ C. These three outputs are coupled to a different first input of three separate AND gates 103–105. The remaining input to ANd gates 103–105 is $3f_{sc}$ signal obtained from output phase lock loop 33. The outputs of AND gates 103–105 are coupled through OR gates 95–97 to the clock inputs of memory units 30–32 respectively. R SEQ A, R SEQ B and R SEQ C signals are also coupled to the second input of a different one of OR gates 98–100 respectively.

R SEQ A, R SEQ B and R SEQ C signals are further coupled to a select decoder 106 which provides a 2-bit digital character to data multiplexer 37 for specifying the coupling of one of memory units 30–32 to data multiplexer 37, or the direct analog-to-digital converter 23 to data multiplexer 37 path. This direct path is provided to enable the digitized video to by-pass the time base error correcting store-fetch portion of the system for comparison purposes and is selected by the generation of a DIRECT signal by an operator accessible control (not shown).

Figure 6:
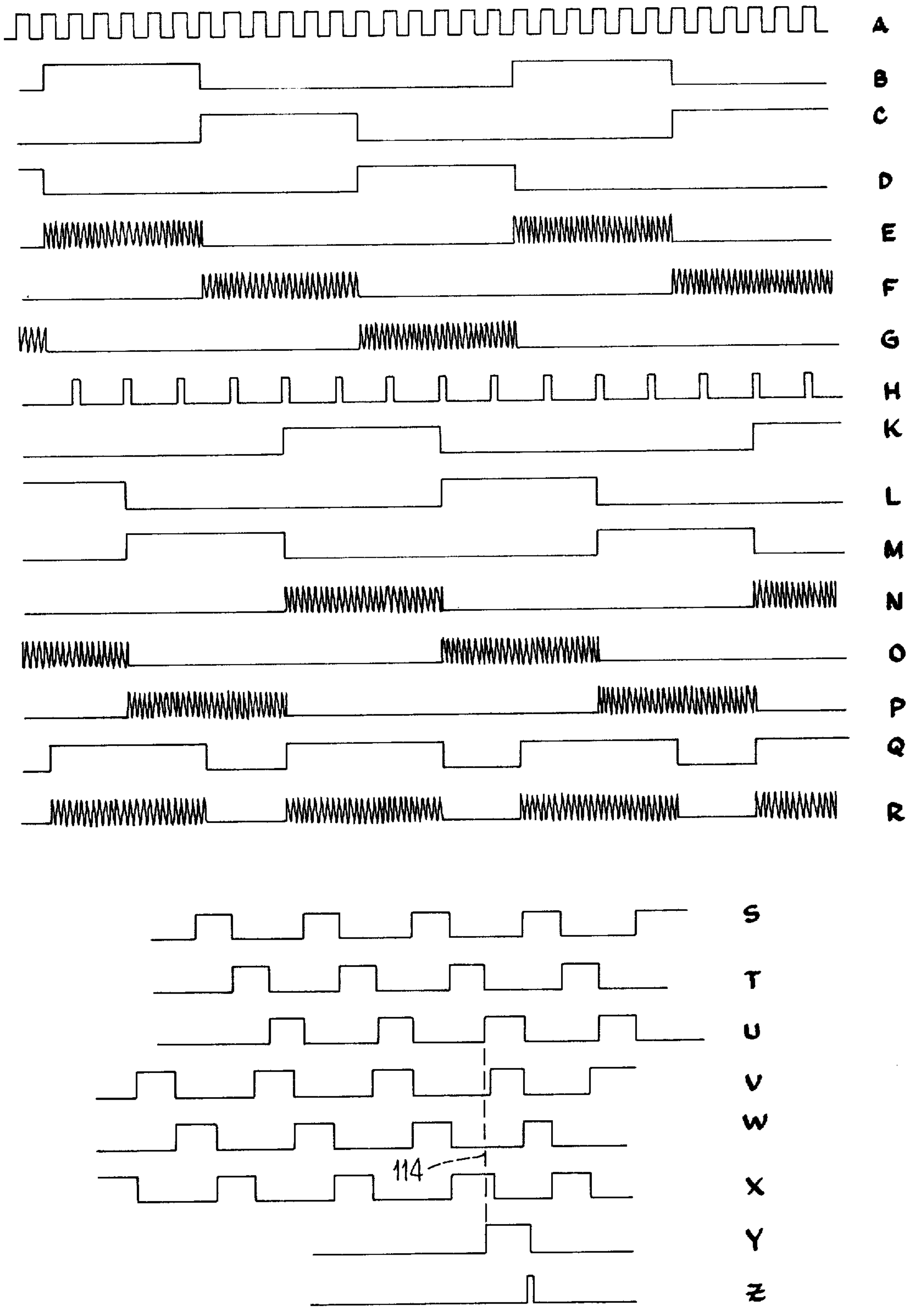
FIG. 6 is a waveform diagram illustrating the operation of the sequence control unit of FIG. 5.

FIG. 6 illustrates various waveforms useful in understanding the operation of sequence control unit 28. For purposes of clarity waveform A, which illustrates VCO 2H signal from input phase lock loop 27, is represented as a constant frequency signal, i.e., a signal having no time base error frequency, but with a fixed phase error with respect to H' signal from sync generator 35, the latter signal being represented by waveform H.

With reference to FIGS. 5 and 6, in operation VCO 2H signals (waveform A) are divided down by counters 90 and 91 to sequentially generate the W SEQ A, W SEQ B and W SEQ C signals (waveforms B–D). These signals are coupled via OR gates 98–100 to sequentially enable a different one of memory units 30–32 for writing data therein. The $3f_c$ clock signals are coupled during any given write interval through one of AND gates 92–94 and OR gates 95–97 (waveforms E–G) to a selected one of memory units 30–32 in order to write successive lines of digital information from analog-to-digital converter 23 into the selected memory unit. After three lines have been written into a specified memory, the adjacent memory is specified by the output of counter 91 and the next three lines of information are written therein.

Contemporaneously with the write operation, counters 101 and 102 divide down the H' timing pulses (waveform H) and sequentially generate the R SEQ A, R SEQ B and R SEQ C signals (waveforms K–M). These signals are coupled via OR gates 98–100 to sequentially enable a different one of memory units 30–32 for fetching data therefrom. The $3f_{sc}$ read clock signals are coupled during any given read interval through one of AND gates 103–104 and OR gates 95–97 (waveforms N–P) to a selected one of memory units 30–32. The combined ENABLE and CLOCK signals coupled to memory unit 30 via OR gates 95, 98, respectively, are illustrated by waveforms Q and R. As shown, memory unit 30 is cylically enabled for writing of data therein and fetching of data therefrom by the ENABLE signals (waveform Q) generated from successive W SEQ A and R SEQ A signals. When enabled, memory unit 30 is alternately clocked by $3f_c$ write clock signals and $3f_{sc}$ read clock signals. As will be evident to those skilled in the art, the separate write and read clock signals are not mutually synchronous. Since the combined ENABLE and CLOCK signals coupled to memory units 31 and 32 are substantially similar to the memory unit 30 ENABLE and CLOCK signals, they are omitted from FIG. 6 to avoid prolixity.

Waveforms A–R illustrate the optimum condition in which the write sequence ENABLE signals (waveforms B–D) are centered between the read sequence ENABLE signals (waveforms K–M). When sequence control unit 28 is operating in this state, a maximum time base error of ±1.5 lines between successive lines of video can be corrected by the invention.

The R SEQ A, R SEQ B and R SEQ C signals are also individually decoded by select decoder 106 to 2-bit SELECT signals for synchronizing the operation of data multiplexer 37 with the fetching of data from one of memory units 30–32. For economy of space, the SELECT signals are omitted from FIG. 6.

The above described contemporaneous write-read operation proceeds as described unless the time base errors exceed the maximum correctable deviation, which results in the generation of overlapping write enable and read enable signals for a single memory unit. When this condition obtains, in order to remedy double clocking of the memory unit by the separate write and read clocks, a special preset circuit presets the operation of sequence control unit 28 in the following fashion. The individual W SEQ A, W SEQ B, W SEQ C, and R SEQ A, R SEQ B and R SEQ C outputs from counters 91 and 102 are paired at the inputs to individual AND gates 107–109. The outputs of AND gates 107–109 are coupled via an OR gate 110 to the input of a latch flip-flop 111, along with a manual reset signal obtained from an operator accessible manual switch (not shown). The output of latch flip-flop 111 is coupled to one input of an AND gate 112 along with W SEQ STEP and W SEQ C signal lines. The output of AND gate 112 is coupled to the present inputs of counters 101, 102. W SEQ A and R SEQ B signals are coupled via AND gate 113 to the reset input of latch flip-flop 109.

In operation, whenever any pair of write and read enable signals are present at the input of one of AND gates 105, 107, indicating an invalid attempt to read and write contemporaneously from the same memory unit, the output from that AND gate sets latch flip-flop 111. When latch flip-flop 111 is set, latch signal appears at one input to AND gate 112 thereby conditioning this element. Upon termination of the next W SEQ C signal, which immediately precedes the generation of W SEQ A signal, AND gate 112 generates a preset signal which presets counters 101, 102 to a combined count representing one third of the total length of the R SEQ B interval.

Waveforms S–Z illustrate the operation of the preset circuit in response to overlap between W SEQ C and R SEQ C write and read enable signals. As illustrated in this figure, W SEQ A, W SEQ B and W SEQ C write enable signals are represented by waveforms S–U. R SEQ A, R SEQ B and R SEQ C read enable signals are represented by waveforms V–X. For illustrative purposes, the write enable signals are all depicted as having a uniform period which is approximately 10% shorter than the uniformly depicted period of the read enable intervals. Thus as operation of the sequence control unit proceeds, the phase difference between the write enable intervals and the read enable intervals accumulates until the W SEQ C write enable signal overlaps the R SEQ C read enable signal at the point indicated by lead line 114. When this overlapping condition obtains, latch flip-flop 111 is set by the output of AND gate 109 via OR gate 110, thereby conditioning AND gate 112. The output of latch flip-flop 111 is represented in FIG. 6 by waveform Y. Thereafter, at the end of the W SEQ C write enable interval, AND gate 112 generates a preset pulse represented by waveform Z thereby presetting counters 101, 102 to the above-noted advanced count. This results in the discarding of one line of video information contained in the first one third portion of memory unit 31 but the visual effect of discarding this information is so negligible as to be unnoticeable for viewing purposes. As noted, latch flip-flop 111 is subsequently reset by the concurrence of W SEQ A and R SEQ B, thereby re-arming the preset circuit for detection of a subsequent overlapping condition.

DATA MULTIPLEXER

Figure 7:
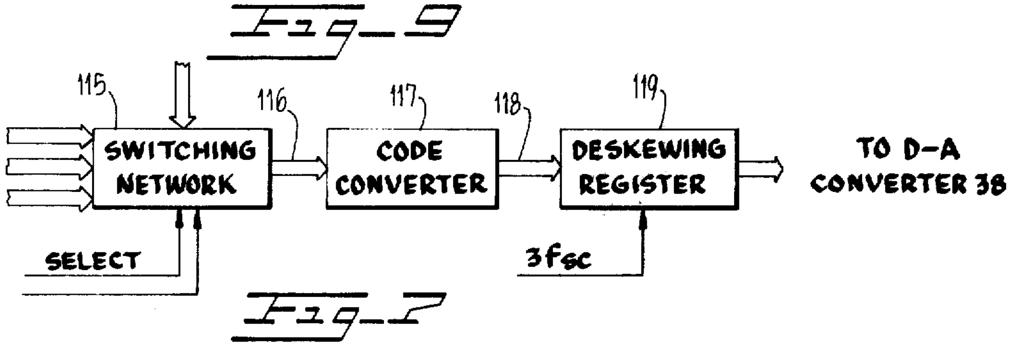
FIG. 7 is a schematic diagram illustrating the data multiplexer.

Data multiplexer 37 is shown in FIG. 7. The individual data inputs from memory units 30–32 and the direct data input from analog-to-digital converter 23 are coupled to the separate data inputs of a switching network 115, which in the preferred embodiment is an 8-pole, four position electronic switch controlled by the select input signals obtained from sequence control unit 28. Data transferred through switching network 115 is coupled via a data bus 116 to the input of a code converter 117. Code converter 117 is a conventional device for converting 8-bit Grey code digital characters to 8-bit binary characters. The output of code converter 117 is coupled via data bus 118 to the input of a deskewing register 119, which in the preferred embodiment comprises 8 flip-flops. Deskewing register 119 removes any skew between the 8 digital character bits introduced during the code conversion. Digital characters are clocked out from deskewing register 119 to digital-to-analog converter 38 with $3f_{sc}$ clocking signala obtained from output phase lock loop 33.

SUBCARRIER PROCESSOR UNIT

Figures 8, 9:
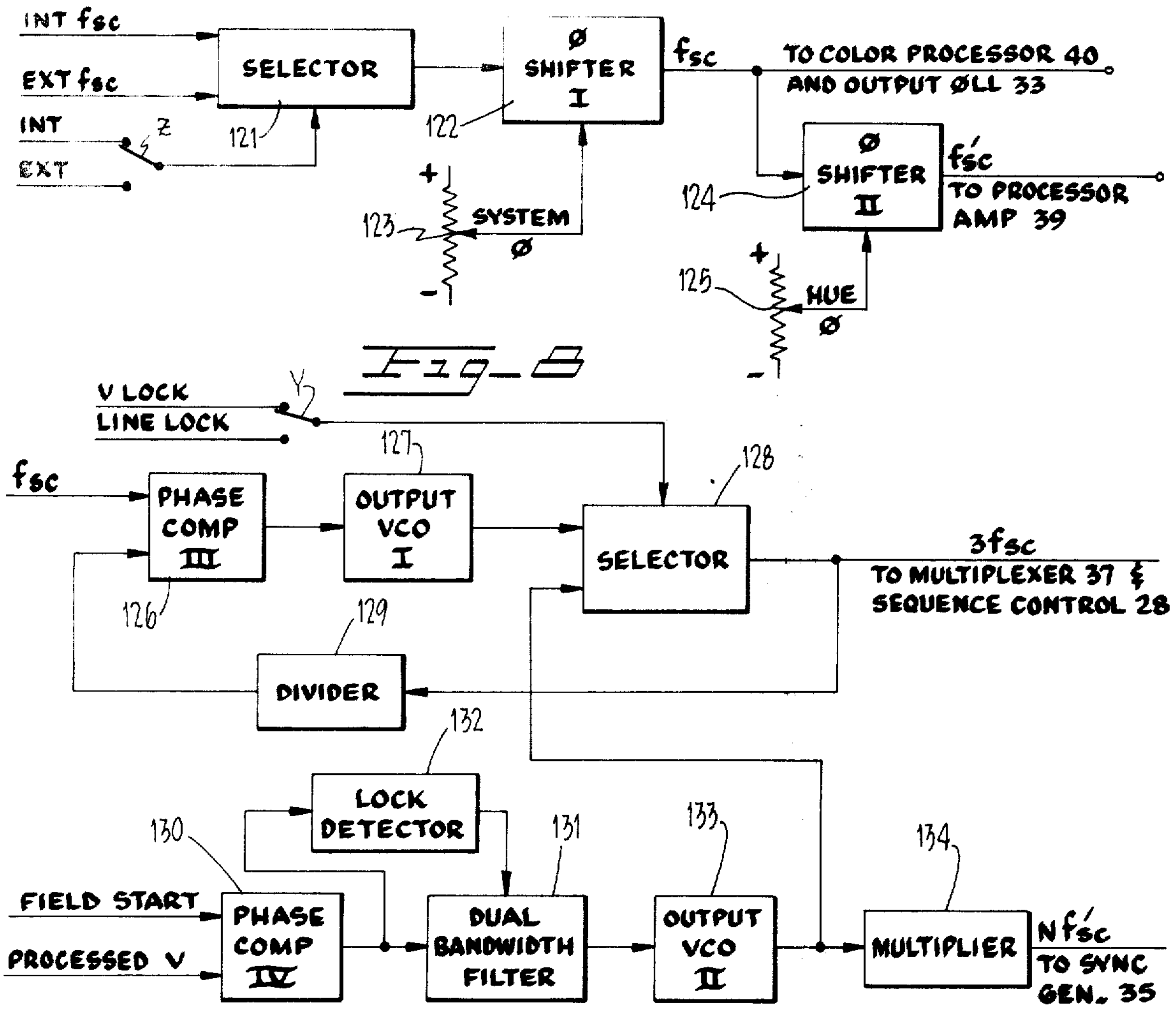
FIG. 8 is a schematic diagram illustrating the subcarrier processor.
FIG. 9 is a schematic diagram illustrating the output phase lock loop.

Subcarrier processor unit 36 is shown in FIG. 8. Internal and external subcarrier frequency signals INT $f_{sc}$ and EXT $f_{sc}$, respectively, are coupled to first and second input terminals of a selector circuit 121 having a control input coupled to the blade of control switch Z. Selector circuit 121 is a conventional electronic switch which transfers signals present on either input terminal to the output terminal thereof on a mutually exclusive basis, depending on the setting of switch Z. Thus, if it is desired to operate the system using an internal subcarrier frequency standard INT $f_{sc}$, switch Z is placed in the illustrated position and this signal will be transferred to the output of selector 121. Conversely, if it is desired to operate the system using an external subcarrier frequency standard EXT $f_{sc}$, switch Z is thrown to the alternate position and EXT $f_{sc}$ is transferred to the output of selector circuit 121.

The output of selector circuit 121 is coupled to the input of a first conventional phase shifter 122 having a control input coupled to a manually adjustable variable resistance 123 for facilitating adjustment of the system phase. The output of first phase shifter 122, designated $f_{sc}$ is coupled to output phase lock loop 33 and color processor 40, and also to the input of a second conventional phase shifter 124. Phase shifter 124 is also provided with a control input coupled to a manually adjustable variable resistance 125 for permitting adjustment of the hue phase of the subcarrier frequency standard $f_{sc}$. The output of second phase shifter 124, designated $f'_{sc}$ is coupled to processing amplifier 39.

OUTPUT PHASE LOCK LOOP

Output phase lock loop 33 is illustrated in FIG. 9. The $f_{sc}$ color subcarrier frequency standard signals output from subcarrier processor 36 are coupled to a first input of a first phase comparator 126. The output of phase comparator 126 is coupled to the input of a first voltage controlled oscillator 127, which in the absence of any control signal input thereto generates a reference signal train having a frequency $3f_c$. The output of voltage controlled oscillator 127 is coupled to a first input terminal of a selector circuit 128 similar to selector circuit 121 of subcarrier processor 36 and having a control input coupled to the moveable blade of control switch Y. The output of selector 128 is coupled to sequence control unit 28 and multiplexer 37 and also to the input of a conventional divider circuit 129 which in the preferred embodiment divides the signal input thereto by a factor of three. The output of divider 129 is coupled to the remaining input terminal of first phase comparator 126.

The FIELD START and PROCESSED V reference signals obtained respectively from sync generator 35 and input phase lock loop 27 are coupled to the input terminals of a second phase comparator 130. The output of phase comparator 130 is coupled to the input of a conventional dual bandwidth filter 131 and also the input of a lock detector 132, the output of which is coupled to the control input of filter 131. Lock detector 132 is a conventional circuit which generates a control signal whenever the magnitude of the signal input thereto exceeds a predetermined threshold value. The output of dual bandwidth filter 131 is coupled to the input of a second voltage controlled oscillator 133, essentially similar to voltage controlled oscillator 127, which generates a reference signal train in the absence of a control signal at the input thereto having a frequency $3f_c$. The output of voltage controlled oscillator 133 is coupled to the remaining input terminal of selector 128 and also to the input of a conventional frequency multiplier circuit 134. The output of multiplier circuit 134, which is a periodic signal train having a frequency which is a multiple N of the signal train input thereto, designated $Nf'_{sc}$ is coupled to the LINE LOCK terminal of control switch Y (FIG. 1).

In operation, with switch Y set to the V-LOCK position, i.e., capstan servo recorder signal input, the upper loop comprising elements 126–129 of input phase lock loop 33 is active and the $3f_{sc}$ output signal train is derived from $f_{sc}$ reference signals input to phase comparator 126. When switch Y is placed in the LINE LOCK mode, i.e., non-capstan servo recorder signal input, the lower loop comprising elements 130–134 is active and the $3f_{sc}$ signal train obtained from the output of voltage controlled oscillator 133 is employed as the output signal train. In this mode, the frequency of the signal output from voltage controlled oscillator 133 is controlled by the phase difference between the FIELD START signals obtained from sync generator 35 and the PROCESSED V signals derived from the input video signals by input phase lock loop 27. It should be noted that the lower loop in this mode includes that portion of sync generator 35 which generates the FIELD START signal train from the $Nf'_{sc}$ signals input thereto via control switch Y (FIG. 1). Thus, the $3f_{sc}$ signal train, which is used to clock sequence control unit 28, multiplexer 37, and digital-to-analog converter unit 38 is phase locked to the vertical sync portions of the input video signals and effectively provides a slowly varying clock reference signal which averages out variations in the input video signal.

Figure 10:
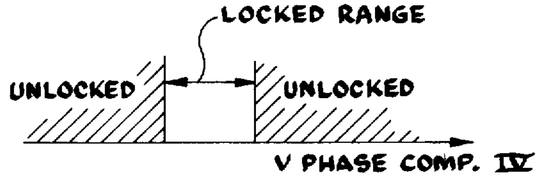
FIG. 10 is a waveform diagram illustrating the operation of the lock detector portion of the output phase lock loop of FIG. 9.

With reference to FIGS. 9 and 10, lock detector 132 is included in the lower loop to provide rapid initial phase lock of the loop onto the input vertical sync. As shown in FIG. 10, if the magnitude of the control signal output from phase comparator 130 lies within the unshaded range, filter 131 operates in the narrow band mode. However, when the magnitude of the control voltage lies outside the lock range, lock detector 132 generates a control signal which switches filter 131 to the wide band mode so that the lower loop can quickly lock to the input vertical sync. Once locked, the control voltage swings into the locked range so that the filter 131 operates in the narrow band width range.

DIGITAL TO ANALOG CONVERTER UNIT

Figure 11:
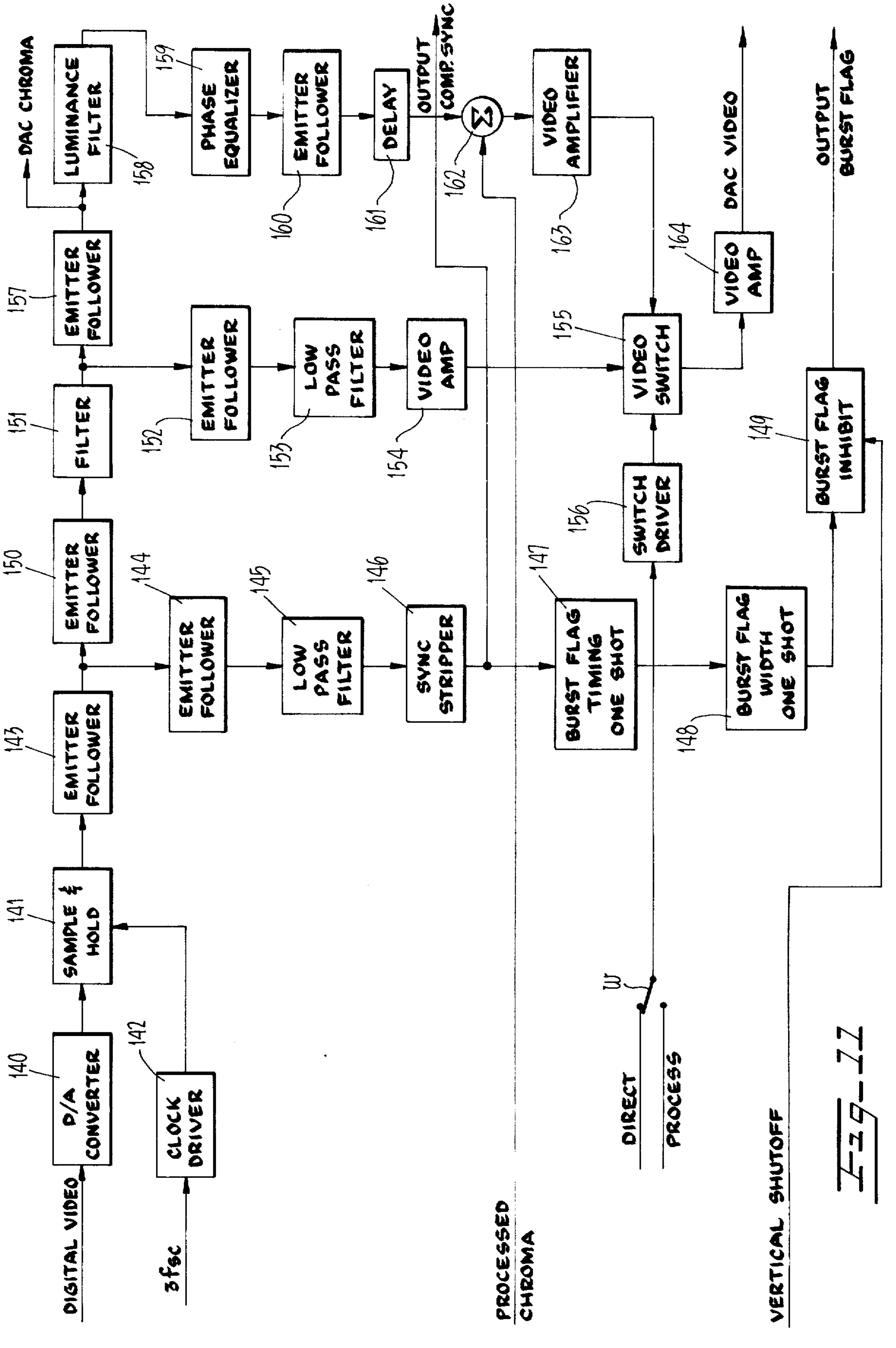
FIG. 11 is a schematic diagram of the digital-to-analog converter unit.

Digital-to-Analog converter unit 38 is illustrated in FIG. 11. Digital video signals output from multiplexer are coupled to the input of a digital-to-analog converter 140, which in the preferred embodiment is a high speed 8-bit binary digital-to-analog converter having an output settling time of about 25 nanoseconds, such as a Detal type DAC HI unit. The output of converter 140 is coupled to a conventional sample and hold circuit 141 which is clocked by the output of a clock driver 142, the input to which is the $3f_{sr}$ reference signal train obtained from output phase lock loop 33. Clock driver 142 is a conventional shaping circuit for generating clocking pulses of appropriate magnitude and width which are compatible with sample and hold circuit 141. Sample and hold circuit 141 and clock driver 142 function as a deskewing circuit which compensates for any relative delay during the digital-to-analog conversion among the 8 digital bits.

The output of sample and hold circuit 141 is coupled through an emitter follower 143 to a junction. The vertical branch extending from the junction comprises an emitter follower 144, a conventional low pass filter 145, a conventional sync stripper 146, which provides output composite sync signals, a burst flag timing one shot circuit 147 having a time out period of about 5.2 microseconds, a burst flag width one shot 148 having a time out period of about 2.5 microseconds and a burst flag inhibit gate 149. Burst flag inhibit gate 149 is controlled by VERTICAL SHUTOFF control signals generated by input phase lock loop 27 and permits and output burst flag to be generated during the appropriate portion of each line of video information occurring during non-vertical blanking intervals. The output of emitter follower 143 is also coupled to a second junction via an emitter follower 150 and a conventional harmonic filter 151 which removes harmonics generated by sample and hold circuit 141. The vertical branch extending from this junction, termed the direct color video path, comprises an emitter follower 152, a video low pass filter 153, a conventional video amplifier 154, and a video switch 155 having a pair of video input terminals operated by a switch driver 156 on a mutually exclusive basis.

The output of harmonic filter 151 is also coupled via an emitter follower 157 to the DAC chroma output terminal of digital-to-analog converter unit 38, which as noted above is coupled to an input terminal of color processor 40 described below, and also to a second vertical branch, termed the processed color video path. This path comprises a conventional luminance band pass filter 158, a phase equalizer 159, which compensates for phase errors introduced by the luminance filter 158, ann emitter follower 160, a delay unit 161, which compensates for the time delay between the processed color video path and the chroma signal path through color processor 40, a summing junction 162 wherein the luminance component received from color processor 40 are linearly combined, and a conventional video amplifier 163, the output of which is coupled to the remaining video input terminal of video switch 155.

Switch driver 156 is coupled to the moveable blade of color mode switch W, which selects either signals from the direct color video path or the processed color video path of the digital-to-analog converter unit for transfer via a video amplifier 164 to the DAC VIDEO output terminal.

In operation, incoming digital video is converted to analog form by converter 140, is stabilized by elements 141, 142, and passed to the first circuit junction. The composite sync is stripped from the incoming video by sync stripper 146 and coupled to processor amplifier 39 and color processor 40. Burst flag is generated by elements 147–149 and coupled to processor amplifier 39 and color processor 40.

The video portion of the signal is passed through filter 151 and coupled to video switch 155 via the direct color video path. If the system is set up to process direct color signals by color mode switch W, switch driver 156 conditions video switch 155 to pass the video information in the direct color path to video amplifier 164, from which DAC VIDEO is output to processor amplifier 39. If the system is configured to accept processed color video signals by switch W, switch driver 156 conditions video switch 55 to accept video from the processed color video path of the digital-to-analog converter unit 38. In this event, the chroma portion of the reconverted video signals input to converter unit 38 is processed by color processor 40 in the manner described below and the luminance portion is transmitted via elements 159–161 to summing junction 162, in which the luminance and the processed chroma received from color processor unit 40 are recombined. Thereafter the signals are transmitted via video amplifier 163, video switch 155 and video amplifier 164 to processor amplifier 39.

COLOR PROCESSOR UNIT

Figure 12:
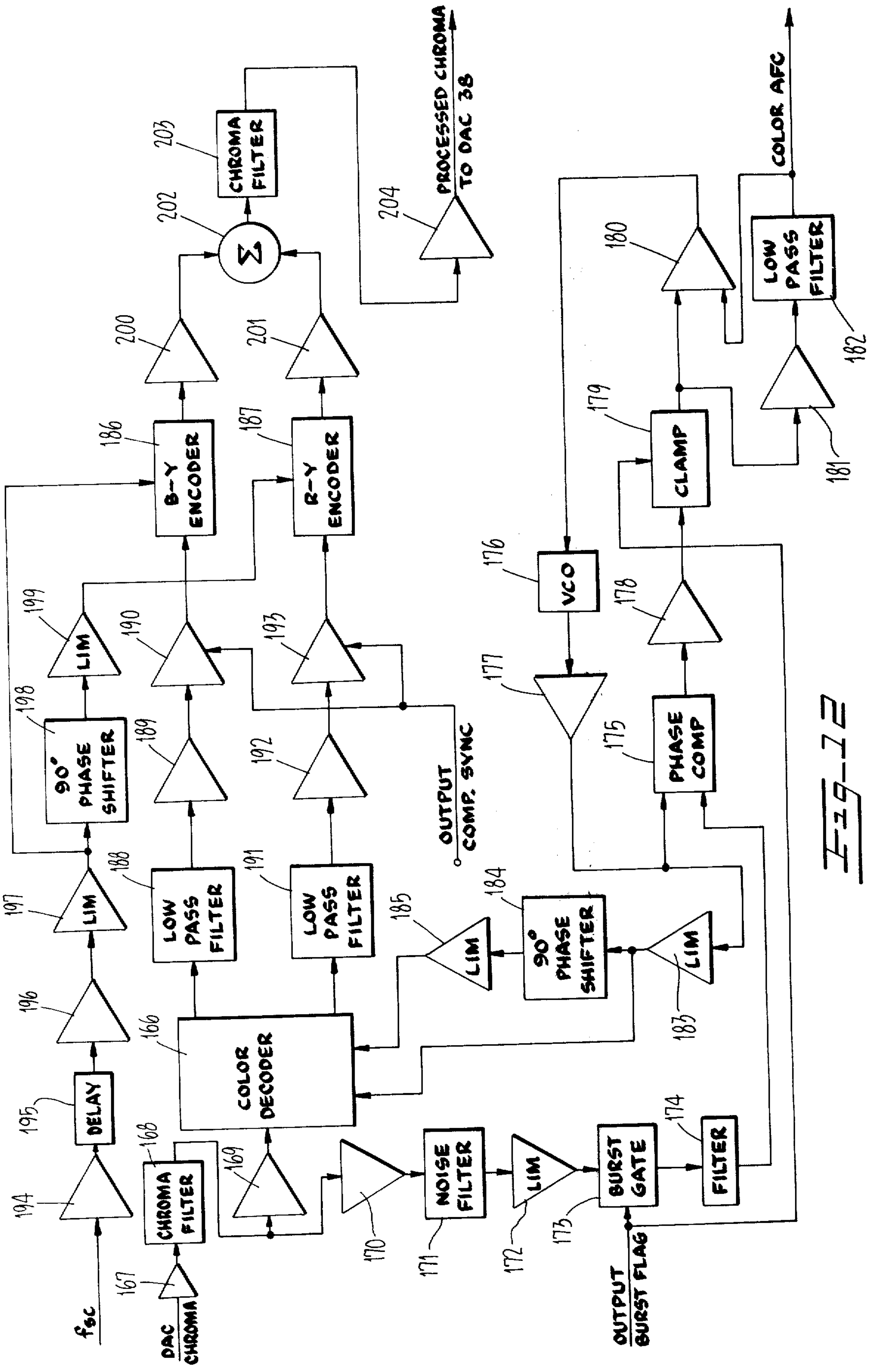
FIG. 12 is a schematic diagram of the color processor unit.

Color processor unit 40 is illustrated in FIG. 12. DAC CHROMA from digital-to-analog converter unit 38 is coupled to the input of a color decoder 166, which preferably comprises a conventional color demodulator unit, via a buffer amplifier 167, a conventional chroma filter 168, and a gain controlled amplifier 169. The output of chroma filter 168 is also coupled to a burst branch of color processor unit 40 which comprises a buffer amplifier 170, a conventional noise filter 171, a limiter amplifier 172, a conventional burst gate 173, controlled by output burst flag signals obtained from digital-to-analog converter unit 38, and a conventional color subcarrier band pass filter 174.

The signals from filter 174 are coupled to a first reference input terminal of a phase comparator 175. The remaining reference input to phase comparator 175 is obtained from a voltage controlled oscillator 176 and a buffer amplifier 177. Voltage controlled oscillator 176 generates a periodic reference signal which, in the absence of a control signal input thereto, has a frequency $f_c$. The output of phase comparator 175 is coupled via an amplifier 178 to the input of a conventional clamp signal 179 which prevents the passage of signals therethrough in the absence of a burst flag signal at the control input thereto. The output of clamp circuit 179 is coupled via an amplifier 180 to the control voltage input to voltage controlled oscillator 176. In addition, the output of clamp circuit 179 is coupled via an amplifier 181 to the input of a low pas filter 182, the output of which generates color AFC signals which are coupled to the remaining input of amplifier 180 and also to input phase lock loop 27 for the purpose described above.

Elements 175–182 comprise a phase lock loop for generating a demodulation carrier for color decoder 166 which is phase locked to the instantaneous burst signal in each line of incoming video information coupled to color processor unit 40. Elements 181, 182 provide a second phase correction signal which is averaged over several lines of information which serves to stabilize the operation of the loop.

The output of phase lock loop is coupled via a limiter amplifier 183 directly to the B–Y carrier input of color decoder 166, and also through a conventional 90° phase shifter 184 and limiter amplifier 185 to the R–Y carrier input to color decoder 166. The demodulated B–Y and R–Y components of the DAC CHROMA are coupled to a pair of conventional color encoder units 186, 187 via parallel branches comprising a low pass filter 188, a buffer amplifier 189, a DC restore amplifier 190; and a low pass filter 191, a buffer amplifier 192, and a DC restore amplifier 193; respectively.

The modulation carrier for encoders 186, 187 is obtained from the $f_{sc}$ reference signal train generated by subcarrier processor unit 36. This signal is coupled to the modulation input of encoder 186 via a buffer amplifier 194, a delay compensation circuit 195, a buffer amplifier 196, and a limiter amplifier 197. The modulation carrier for encoder 187 is derived from $f_{sc}$ by a conventional 90° phase shifter 198 and coupled via a limiter amplifier 199 to the modulation input of encoder 187. The respective outputs of encoders 186, 187 are coupled via buffer amplifiers 200, 201 to a summing junction 202, the output of which is coupled via a conventional chroma filter 203 and a buffer amplifier 204 to the processed chroma output terminal.

In operation, the incoming DAC CHROMA signals are de-modulated by the instantaneous burst portion of each successive line of video information to remove hue phase variations in the signals. The de-modulated signals are re-encoded with the reference frequency standard signal supplied by the subcarrier processor unit 36 and coupled back to digital-to-analog converter unit 38 where they are re-combined with the corresponding luminance portions and output to processor amplifier 39.

PROCESSOR AMPLIFIER

Figure 13:
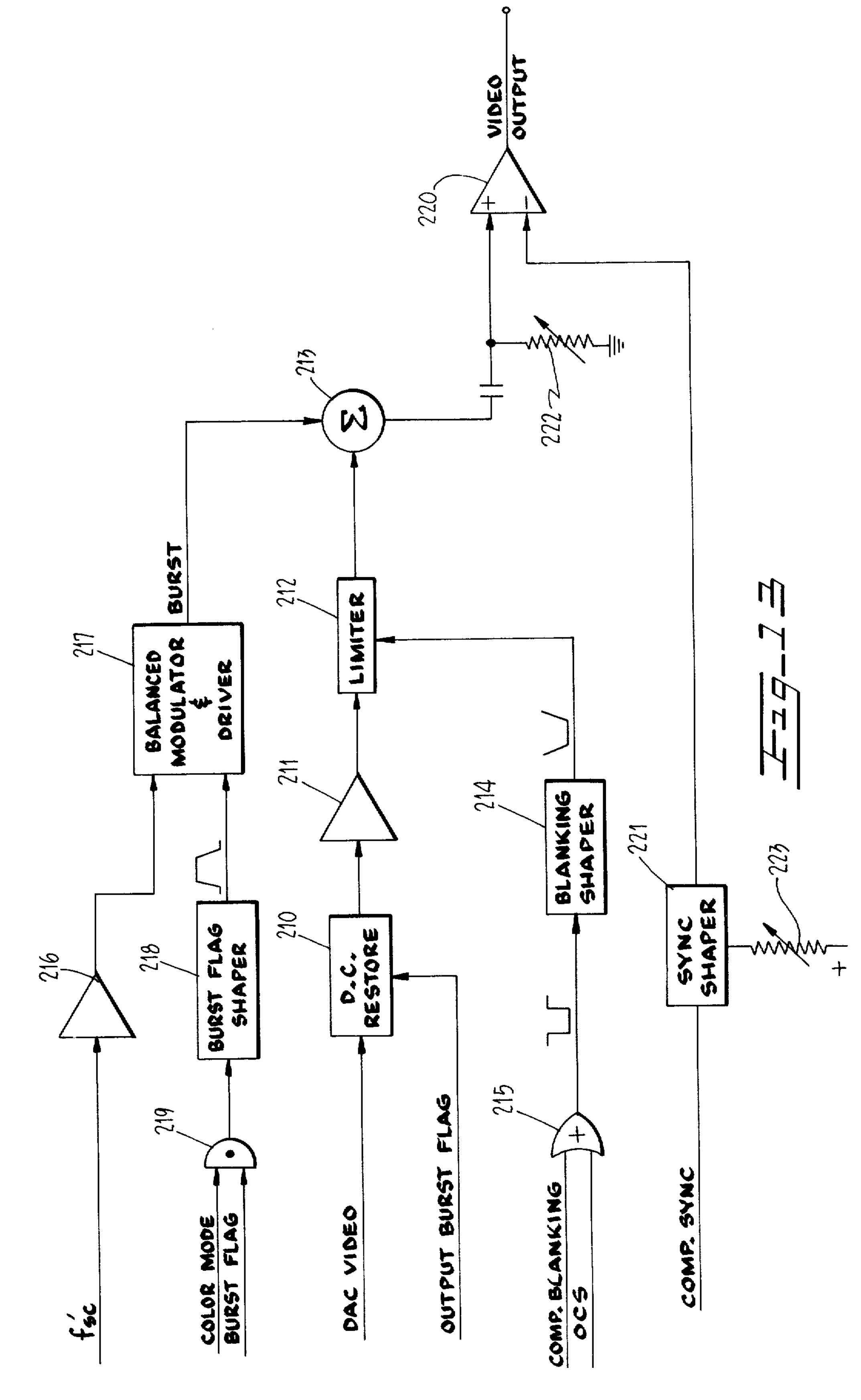
FIG. 13 is a schematic diagram of the processor amplifier unit.

Processor amplifier 39 is shown in FIG. 13. Incoming DAC video signals are coupled to the input of a conventional DC restore circuit 210 having a level setting control input controlled by the level of the output burst flag signals input thereto from digital-to-analog converter unit 38. The video output signals from DC restore unit 210 are coupled via a buffer amplifier 211 and a limiter 212 to a summing junction 213. Limiter 212 has a control input coupled to the output of a blanking shaper 214, which is preferably a conventional slew rate limiter, controlled by the output from an OR gate 215. The input signals to OR gate 215 are COMPOSITE BLANKING reference signals obtained from sync generator 35 and OUTPUT COMPOSITE SYNC signals obtained from digital-to-analog converter 38. Blanking shaper 214 provides a slewed control pulse for limiter 212 which avoids the introduction of transients on the edges of the signal output therefrom to summing junction 213. The composite blanking and output composite sync signals used to drive blanking shaper 214 improve the ability of the limiter 212 to remove undesired sync portions of the signal which may be remaining in the DAC VIDEO signals input to DC restore circuit 210.

New color burst is generated for combination with the DAC VIDEO signals from $f'_{sc}$ reference frequency signal train obtained from subcarrier processor unit 36. These signals are coupled via a limiter amplifier 216 to the carrier input of a conventional balanced modulator and driver 217. The remaining input to modulator and driver 217 is obtained from the output of a conventional burst flag shaper 218 which is preferably a slew rate limiter driven by the output of an AND gate 219. The control input signals to AND gate 219 are COLOR MODE control signals obtained from the output of input phase lock loop 27 and BURST FLAG obtained from sync generator 35. The output of balanced modulator and driver 217 is a synthetic burst signal which is linearly combined in summing junction 213 with the video portion of the time base corrected signal.

The output of summing junction 213 is AC coupled to a first input of a differential video amplifier 220, the remaining input to which is the composite sync reference signal obtained from sync generator 35 and passed through a conventional sync shaper circuit 221.

A pair of individually adjustable variable resistances 222, 223 are provided for enabling adjustment of the video and sync levels, respectively, of the output video signals. The output of video amplifier 220 is coupled to the output terminal of the system, which provides the time base corrected composite video signals to appropriate follow-on devices.

SYSTEM OPERATION

The system is capable of operation in several distinct modes, depending on the nature of the upstream equipment furnishing the raw composite video input signals, the chromatic nature of the input video signals, i.e., whether monochromatic or color, and, if color, the type of color, i.e., whether direct or processed. In addition, the system has a special operational mode termed INTERLACE which is employed to convert processed color signals to quasi-direct color signals. The various operational modes are described in detail below.

Signal Source Mode

The invention is capable of processing video signals obtained from V-LOCK video signal sources, such as a capstan servo recorder, and LINE LOCK video signal sources, such as a non-capstan servo recorder. Control switch Y is used to condition the system with respect to the type of signal source from which the uncorrected video signals are obtained. For processing signals obtained from generator locked sources, such as a capstan servo recorder, switch Y is placed in the V LOCK position; for processing signals obtained from nongenerator locked sources, such as a non-capstan servo recorder, switch Y is placed in the LINE LOCK position. In V LOCK mode, the upper loop of output phase lock loop 33 generates clocking signals for sequence control unit 28, multiplexer 27 and digital-to-analog converter unit 38. Depending on the position of switch Z, sync generator 35 and subcarrier processor 36 are either driven by external composite sync, composite blanking and color subcarrier $f_{sc}$ reference signals, or sync generator 35 is used as the master timing generator to drive the associated generator locked video signal source and to provide INT $f_{sc}$ reference signals to subcarrier processor unit 36. In the LINE LOCK mode, the lower loop in output phase lock loop 33 is used to generate the $3f_{sc}$ clock signal train for units 28, 37 and 38 and the $N'f_{sc}$ signals from output phase lock loop 33 are coupled to the sync generator 35 via switch Y to control the frequency of the FIELD START reference signals generated thereby, which in turn are coupled back to output phase lock loop 33 to phase lock both output reference signal trains from this unit to the frequency of the input video signals (PROCESSED V). INT $f_{sc}$ reference signals are derived from either Nf oscillator 34 or the $Nf'_{sc}$ signals from output phase lock loop 33, depending on the position of interlace switch X.

Color Mode

If the uncorrected video signals input to the system are color video signals, the system may be controlled in accordance with the nature of the input color signals, i.e., direct color or processed color. This control function is directed by control switch W, which controls the operation of input phase lock loop 27 and digital-to-analog converter unit 38. If the uncorrected color input video signals are direct color, both the coarse and fine loops of the input phase lock loop 27 are enabled for operation. In addition, the direct video path in digital-to-analog converter unit 38 is selected to furnish the DAC VIDEO signals to processor amplifier 39 which serves to bypass the color processor unit 40. If the uncorrected color video input signals are processed color, the fine correction loop in input phase lock loop 27 is disabled and the processed color video path in digital-to-analog converter unit 38 is selected for operation so that the chroma portion of the signals, after passing through the memory units 30-32, multiplexer 37 and a portion of digital-to-analog converter unit 38, are coupled to color processor unit 40, where they are decoded to remove hue phase variations, re-encoded with $f_{sc}$ signals from subcarrier processor 36 and coupled as processed chroma back to digital-to-analog converter unit 38 where they are recombined with the luminance portion thereof.

Interlace Mode

This special mode of operation is employed in combination with LINE LOCK and PROCESS modes. In LINE LOCK mode, it will be remembered, the $3f_{sc}$ signal train for units 28, 37 and 38 is phase locked to the vertical sync portions of the incoming video signals. In addition, the PROCESS mode, the chroma portions of the time base corrected video signals are demodulated with $f_{sc}$ reference signals from subcarrier processor 36. In the special INTERLACE mode, switch X is thrown to the position illustrated in FIG. 1 so that the variable frequency $Nf'_{sc}$ reference signals from output phase lock loop 33 are not only used to control the generation of FIELD START signals by sync generator 35 but also used to serve as a reference standard for generating INT $f'_{sc}$ which in turn furnishes the reference frequency standard $f_{sc}$ for color processor unit 40 and output phase lock loop 33 which generates the $3f_{sc}$ clocking signals for units 28, 37 and 38. Thus, in INTERLACE mode, processed color signals are first time base corrected in accordance with the frequency deviations present in the input video signals, are fetched and converted to analog form at a sampling rate which follows the long term (PROCESSED V) variations in the input signals and are re-encoded by a carrier reference frequency $f_{sc}$ also derived from the long term (PROCESSED V) variations. The resulting time base corrected video output signals are signals which are properly phased in accordance with the NTSC definition of direct color but which have color frequencies which are not identical with NTSC defined color subcarrier. Such signals are hereinafter designated as quasi-direct color signals.

The following examples illlustrate the various combined modes of operation of which the invention is capable.

Mono-V-Lock Mode

In this mode of operation, monochromatic video information signals from a capstan servo recorder are time base corrected to broadcast quality monochromatic signals. Input phase lock loop 27 operates on the coarse loop only. The $3f_{sc}$ clocking signals, the H' sequencing signals and the composite sync and composite blanking signals are fully phase locked to the associated video tape recorder either internally with sync generator 35 serving as the master timing generator or externally by a studio generator.

Direct-Color-V-Lock Mode

In this mode of operation, direct color signals from a capstan servo recorder or the like are time base corrected and furnished to the output as broadcast quality direct color video signals. Input phase lock loop 27 operates on both the coarse and fine loop, and the $3f_{sc}$ clocking signals, the H' sequencing signals and the composite sync, composite blanking and burst flag signals are fully phase locked to the recorder, either externally or internally.

Process-Color-V-Lock Mode

In this mode of operation, processed color signals from a capstan servo recorder or the like are time base corrected and furnished to the output as broadcast quality direct color video signals. Input phase lock loop 27 operates in the coarse loop only and the chroma portions of the time base corrected video signals are demodulated to remove hue phase variations in color processor unit 40 and re-encoded with color subcarrier frequency standard $f_{sc}$ obtained either internally from oscillator 34 or externally from a studio generator. The $3f_{sc}$ clocking signals, H' frequency signals, and composite sync, composite blanking, and burst flag signals are fully phase locked to the recorder, either internally or externally.

Mono-Line-Lock-Mode

In this mode of operation, monochromatic video signals from a non-capstan servo recorder or the like are time base corrected and furnished to the output terminal as monochromatic video signals having substantially reduced time base errors. Input phase lock loop 27 operates on the coarse loop only. The $3f_{sc}$ clocking signals follow the long term variations of the vertical sync portions of the input video.

Process-Color-Line-Lock Mode

In this mode of operation, processed color input video signals from a LINE LOCK source are time base corrected and furnished to the output as processed color video signals having substantially reduced time base errors. The input phase lock loop 27 operates on the coarse loop only. The $3f_{sc}$ clocking signals follow the long term variations in the input video signals. The chroma portion of the time base corrected video signals are demodulated by color processor unit 40 and re-encoded with standard $f_{sc}$ obtained from frequency standard oscillator 34.

Interlace Mode

In this mode of operation, processed color video signals from a non-capstan servo recorder or the like are time base corrected and converted to quasi-direct color video output signals in which the color burst portions of each line are properly phased but in which the absolute color frequency may deviate beyond acceptable limits for broadcast purposes. Input phase lock loop 27 operates on the coarse loop only. The $3f_{sc}$ clocking signals, H' sequencing signals, composite sync, composite blanking and burst flag signals and the color subcarrier frequency standard $f_{sc}$ are all phase locked to the long term variations in the input video signals.

The invention described above provides a video signal processor for removing time base errors which possesses unparalleled flexibility. The exceedingly wide correction range of ±1.5 lines of video information enables relatively low cost video tape recorders to be used as a video signal source. In addition, broadcast quality monochromatic and color video signals can be provided by the invention from relatively low cost capstan servo video tape recorders. When used with non-capstan servo video tape recorders, the invention is capable of providing high quality time base corrected monochromatic and color video signals for use in closed circuit TV installations. Perhaps most importantly, however, when operated in the INTERLACE mode with processed color video from a non-capstan servo recorder, the system generates quasi-direct color video signals which can be simply converted to broadcast quality direct color video signals by dubbing the output of the system up to a capstan servo recorder or a quadra-plex color video tape recorder, recording the signals, and reproducing them in the conventional manner.

A wide variety of possible combinations of the invention with conventional television equipment is possible. The following lists just a few of these possibilities. Using sync generator 35 as a studio generator, the input of the system of FIG. 1 can be coupled to the output of a capstan servo recorder and the output of the system of FIG. 1 can be coupled to a video mixer along with the output of one or more television cameras locked to sync generator 35 to enable wipes, fades and other editing techniques among the video signals from the several cameras and the program content of the video tape reproduced by the recorder. The same results can be obtained by coupling the FIG. 1 system to a studio generator, placing control switch Z in the EXT position. In INTERLACE mode, a non-capstan servo recorder can be coupled to the input of the system and the system output can be coupled to a video mixer along with the output of one or more studio cameras using sync generator 35 as the master timing generator. The output of the mixer can be coupled to the input of a quadraplex or capstan servo recorder operating in the record mode. After recording, the capstan servo recorder can be operated in the play back mode under control of a studio generator or sync generator 35 to generate broadcast quality direct color video signals. If desired, the output of the recorder may be coupled through the FIG. 1 system during play back for further processing to improve the quality of the color video signals. Other adaptations of the invention will occur to those skilled in the art.

While the above provides a full and complete disclosure of the preferred embodiment of the invention, various modifications, alternate constructions, and equivalents may be employed without departing from the true spirit and scope of the invention. Therefore, the above description and illustrations should not be construed as limiting the scope of the invention, which is defined by the appended claims.

What is claimed is:

1. In a video signal processing system for removing time base errors from video type information signals, said system having an input terminal adapted to be coupled to said information signals, input means adapted to be coupled to said input terminal and having a plurality of output terminals; an input phase lock loop unit having a plurality of input terminals coupled to said input means and a plurality of output terminals, said unit including means for generating input clock reference signals having a variable rate dependent upon said time base errors in said information signals; means for sampling said information signals at a rate determined by said input clock reference signals, said sampling means having a control input coupled to said input phase lock loop; memory means coupled to said sampling means for temporarily storing said sampled signals at a rate determined by said input clock reference signals; an output clock generator for generating output clock reference signals having a second rate; sequencer means coupled to said input phase lock loop and said output clock generator for controlling the application of said input and said output clock reference signals to said memory means to sequentially store said sampled signals at said variable rate and fetch said stored signals at said second rate; and output means coupled to said memory means; the improvement wherein said input phase lock loop unit includes control signal generating means for generating a control signal having a magnitude dependent upon the phase difference between a reference signal train and a predetermined portion of said information signals, and generating means having a control signal input coupled to said control signal generator means for generating a reference signal train having a frequency dependent upon the magnitude of said control signal;

said generating means including first means for generating a first reference signal train having a frequency substantially equal to the repetition rate of a previously received one of the horizontal sync and equalizer pulse portions of said information signals, and second means for generating a second reference signal train having a predetermined frequency substantially equal to the frequency of the previously received burst portion of said information signals;

said control signal generating means including a first comparator means for generating a first control signal having a magnitude dependent upon the phase difference between said first reference signal train and a subsequently received one of said horizontal sync and equalizer pulse portions of said information signals, and a second comparator means for generating a second control signal having a magnitude dependent upon the phase difference between said second reference signal train and a subsequently received burst portion of said information signals;

first selector means for enabling operation of said second reference signal train generating means and said second comparator means when said information signals comprise direct color video signals, said selector means including means for generating first and second mode signals specifying direct and process mode respectively; and third means for generating a third reference signal train having a frequency substantially equal to the frequency of successive vertical sync portions of said information signals.

2. The combination of claim 1 wherein said third generating means includes a vertical sync stripper having an input coupled to the video output terminal of said input means and a delay device having an input coupled to the output of said vertical sync stripper for delaying signals input thereto to compensate for signal delays in other portions of said system.

3. The combination of claim 1 wherein said output means includes a digital-to-analog converter unit for converting said stored signals fetched from said memory means to analog form, and a color processor for correcting the chroma portion of processed color type information signals, said color processor having a video input terminal and a subcarrier $f_{sc}$ input terminal, said digital-to-analog converter unit having a direct color video branch, a processed color video branch including an output terminal coupled to said color processor video input terminal, switch means having a first and second video signal input terminals coupled respectively to the output of said direct and processed color video branches, a video output terminal, and a control signal input terminal coupled to said selector means for enabling the transfer of video signals from said first video signal input terminal to said video output terminal in response to receipt of said direct mode signal and for transferring the signals at the input of said second signal input terminal to said video output terminal in response to receipt of said process mode signal.

4. The combination of claim 3 wherein said digital-to-analog converter unit further includes a composite sync output terminal, a burst flag output terminal, and a third branch for furnishing composite sync signals derived from the video signals input thereto to said composite sync output terminal and for furnishing output burst flag signals derived from the video signals input thereto to said burst flag output terminal.

5. The combination of claim 1 wherein said output clock generator includes:

a sync generator having a plurality of input terminals and a plurality of output terminals, means for generating an INT $f_{sc}$ reference signal train from a first $(M/N) f_{sc}$ signal input thereto, and means for generating composite blanking and burst gate signals, H' sequence control signals and composite sync and field start pulses, all in response to a second $(M/N) f_{sc}$ signal input thereto;

second selector means for generating third and fourth mode signals specifying internal and external mode respectively;

a subcarrier processor having a first input terminal coupled to the INT $f_{sc}$ reference signal train output terminal of said sync generator and a second input terminal adapted to be coupled to an external source of an EXT $f_{sc}$ reference signal train, an $f_{sc}$ signal output terminal, and control means coupled to said second selector means for transferring the signals present at said first input terminal to said output terminal in response to the receipt of said internal mode signal and for transferring the signals present at said second input terminal. to said output terminal in response to the receipt of said external mode control signal;

third selector means for generating fifth and sixth mode signals specifying V lock and line lock mode respectively, said third selector means including switch means having a first input terminal adapted to be coupled to a source of said first $(M/N) f_{sc}$ signal and a second input terminal, and an output terminal coupled to an input terminal of said sync generator for supplying said second $(M/N) f_{sc}$ signal; and an output phase lock loop unit having a first input terminal coupled to the $f_{sc}$ signal output terminal of said subcarrier processor, a second input terminal coupled to the field start output signal terminal of said sync generator, a third input terminal coupled to the third reference signal train output terminal of said input phase lock loop unit, a first output coupled to an input of said sequence control unit for furnishing said output clock reference signals thereto, a second output terminal for furnishing $(M/N) f_{sc}$ signals to said second input terminal of said switch means, control means coupled to said third selector means, means coupled to said control means for generating said output clock reference signals from said $f_{sc}$ signal in response to receipt of said V lock mode signal and for generating said output clock reference signals from said field start signals and said third reference signal train in response to receipt of said line lock mode signal, and means coupled to said last-named means and said second output terminal for generating said $(M/N) f_{sc}$ signals.

6. The combination of claim 5 wherein said source of said first $(M/N) f_{sc}$ signal comprises an oscillator means having an output terminal coupled to said first input terminal of said third selector switch means, and further including means for coupling said oscillator output terminal to the first $(M/N) f_{sc}$ signal input terminal of said sync generator.

7. The combination of claim 6 wherein said coupling means comprises a switch means having a first input terminal coupled to said oscillator output terminal, a second input terminal coupled to said second output terminal of said output phase lock loop unit and an output terminal coupled to said first $(M/N) f_{sc}$ signal input terminal of said sync generator.

8. The combination of claim 5 wherein one of said plurality of sync generator input terminals is adapted to be coupled to an external source of composite sync signals and another one of said plurality of sync generator input terminals is adapted to be coupled to an external source of composite blanking signals.

9. The combination of claim 5 wherein said output phase lock loop unit includes means for generating an internal reference signal train, a first phase comparator means coupled to said first input terminal and the output of said internal reference signal train generating means, means having an input coupled to the output of said first phase comparator means for generating a first set of output clock reference signals having a frequency dependent upon the output signal from said first phase comparator means, a second phase comparator means coupled to said second input terminal and said third input terminal, means having an input coupled to the output of said second phase comparator means for generating a second set of output clock reference signals having a frequency dependent upon the output signal from said second phase comparator means;

said control means includes switch means having first and second transfer inputs coupled respectively to the output of said means for generating said first and second sets of output clock reference signals and a control element coupled to said third selector means; and said $(M/N) f_{sc}$ signal generating means includes multiplier means having an input coupled to the output of said means for generating said second set of output clock reference signals for generating said $(M/N) f_{sc}$ reference signal train from the signals input thereto.

10. The combination of claim 9 wherein said output phase lock loop unit further includes a bandwidth filter having at least two operating bandwidth ranges and a control element for selecting either one of said at least two operating bandwidth ranges in response to a range control signal, an input terminal coupled to the output of said second phase comparator means and an output terminal coupled to the input of said means for generating said second set of output clock reference signals; and a lock detector means having an input coupled to the output of said second phase comparator means and an output coupled to said control element for controlling the bandwidth of said bandwidth filter.

11. The combination of claim 5 wherein said subcarrier processor includes an $f'_{sc}$ signal output terminal;

switch means having a pair of transfer input terminals coupled respectively to said first and second subcarrier processor input terminals and an output terminal;

a first adjustable phase shifter having an input terminal coupled to the output of said subcarrier processor switch means and an output terminal for furnishing said $f_{sc}$ signals to said output phase lock loop; and a second adjustable phase shifter having an input terminal coupled to the output of said first adjustable phase shifter and an output coupled to said $f'_{sc}$ signal output terminal for furnishing $f'_{sc}$ signals to said output means.

12. The combination of claim 11 wherein said input phase lock loop unit includes means responsive to receipt of color video information signals by said input means for generating a color mode signal;

and wherein said output means includes:

a digital-to-analog converter unit for coverting said stored signals fetched from said memory means to analog form, said digital-to-analog converter unit including a video output terminal for manifesting said analog signals, means for deriving composite sync signals from said analog signals, means for generating output burst flag signals derived from said analog signals, and a plurality of output terminals for manifesting said composite sync signals and said output burst flag signals; and a processor amplifier for further processing said analog signals, said processor amplifier including a first plurality of input terminals each coupled to a different one of the composite sync, burst flag and composite blanking output terminals of said sync generator, said $f'_{sc}$ signal output terminal of said subcarrier processor, and the color mode signal output terminal of said input phase lock loop unit; a second plurality of input terminals each coupled to a different one of said composite sync, burst flag and video output terminals of said digital-to-analog converter unit; means for generating burst signals from the $f'_{sc}$, color mode and burst flag signals input coupled to respective ones of said first plurality of input terminals; means for generating blanking signals from the composite blanking and composite sync signals coupled thereto from said digital-to-analog converter unit and for inserting said blanking signals into video signals input thereto; and means for combining said burst signals, said video signals and the composite sync signals input thereto from said sync generator.

13. The combination of claim 12 wherein said burst signal generating means includes a gating means coupled to the color mode terminal and burst flag input terminal of said first plurality of input terminals and having an output, a burst flag shaper having an input coupled to the output of said gating means and an output terminal, and a balanced modulator coupled to the $f'_{sc}$ input terminal and the output of said burst flag shaper.

14. The combination of claim 12 wherein said blanking signal generator includes a DC restore circuit coupled to the input video terminal and the burst flag terminal of said second plurality of terminals, and having an output terminal;

second gating means coupled to said composite blanking terminal of said first plurality of input terminals and said composite sync input terminal of said second plurality of input terminals, and having an output terminal;

a blanking shaper circuit having an input coupled to the output of said second gating means and an output terminal; and a limiter circuit having a first input coupled to the output of said DC restore circuit and a control signal input coupled to the output of said blanking shaper circuit.

15. The combination of claim 14 wherein said combining means includes a summing network having a first input coupled to the output of said balanced modulator and a second input coupled to the output of said limiter circuit, and a differential amplifier having a first input coupled to the output of a summing network and a second input coupled to said composite sync input terminal of said first plurality of input terminals.

16. The combination of claim 15 wherein said processor amplifier further includes a sync shaper circuit having an input coupled to said composite sync input terminal of said first plurality of input terminals and an output coupled to said second input of said differential amplifier.

17. For use in a video signal processing system for removing time base errors from video type information signals, an input phase lock loop unit having a plurality of input terminals and a plurality of output terminals, a control signal generating means for generating a control signal having a magnitude dependent upon the phase different between a reference signal train and a predetermined portion of said information signals, and generating means having a control signal input coupled to said control signal generator means for generating a reference signal train having a frequency dependent upon the magnitude of said control signal, said generating means including first means for generating a first reference signal train having a frequency substantially equal to the repetition rate of a previously received one of the horizontal sync and equalizer pulse portions of said information signals, and second means for generating a second reference signal train having a predetermined frequency substantially equal to the frequency of the previously received burst portion of said informatiaon signals;

said control signal generating means including a first comparator means for generating a first control signal having a magnitude dependent upon the phase difference between said first reference signal train and a subsequently received one of said horizontal sync and equalizer pulse portions of said information signals, and a second comparator means for generating a second control signal having a magnitude dependent upon the phase difference between said second reference signal train and a subsequently received burst portion of said information signal;

first selector means for enabling operation of said second reference signal train generating means and said second comparator means when said information signals comprise direct color video signals, said selector means including means for generating first and second mode signals specifying direct and process mode respectively; and third means for generating a third reference signal train having a frequency substantially equal to the frequency of successive vertical sync portions of said information signals.

18. The combination of claim 17 wherein said third generating means includes a vertical sync stripper having an input coupled to a different one of said input terminals and a delay device having an input coupled to the output of said vertical sync strippers for delaying signals input thereto to compensate for signal delays in other portions of said processing system.

19. The combination of claim 17 wherein said input phase lock loop unit includes means responsive to receipt of color video information signals by said system for generating a color mode signal.

20. For use in a video signal processing system for removing time base errors from video type information signals, an output clock generator for generating output clock reference signals, said generator including:

a sync generator having a plurality of input terminals and a plurality of output terminals, means for generating an INT $f_{sc}$ reference signal train from a first $(M/N) f_{sc}$ signal input thereto, and means for generating composite blanking and burst gate signals, H' sequence control signals and composite sync and field start pulses, all in response to a second $(M/N) f_{sc}$ signal input thereto;

selector means for generating first and second mode signals specifying internal and external mode respectively;

a subcarrier processor having a burst input terminal coupled to the INT $f_{sc}$ reference signal train output terminal of said sync generator and a second input terminal adapted to be coupled to an external source of an EXT $f_{sc}$ reference signal train, and $f_{sc}$ signal output terminal, and control means coupled to said selector means for transferring the signals present at said first input terminal to said output terminal in response to the receipt of said internal mode signal and for transferring the signals present at said second input terminal to said output terminal in response to the receipt of said external mode control signal;

second selector means for generating third and fourth mode signals specifying V-LOCK and LINE LOCK mode respectively; said second selector means including switch means having a first input terminal adapted to be coupled to a source of said first $(M/N) f_{sc}$ signal and a second input terminal, and an output terminal coupled to an input terminal of said sync generator for supplying said second $(M/N) f_{sc}$ signal; and an output phase lock loop unit having a first input terminal coupled to the $f_{sc}$ signal output terminal of said subcarrier processor, a second input terminal coupled to the field start output signal terminal of said sync generator, a third input terminal coupled to an externally supplied reference signal train output terminal, a first output for furnishing output clock reference signals, a second output terminal for furnishing $(M/N) f_{sc}$ signals to said second input terminal of said switch means, control means coupled to said second selector means, means coupled to said control means for generating said output clock reference signals from said $f_{sc}$ signal in response to receipt of said V-LOCK mode signal and for generating said output clock reference signals from said field start signals and said externally supplied reference signal train in response to receipt of said line lock mode signal, and means coupled to said last named means and said second output terminal for generating said $(M/N) f_{sc}$ signals.

21. The combination of claim 20 wherein said source of said first $(M/N) f_{sc}$ signal comprises an oscillator means having an output terminal coupled to said first input terminal of said first selector switch means, and further including means for coupling said oscillator output terminal to the first $(M/N) f_{sc}$ signal input terminal of said sync generator.

22. The combination of claim 21 wherein said coupling means comprises a switch means having a first input terminal coupled to said oscillator output terminal, a second input terminal coupled to said second output terminal of said output phase lock loop unit and an output terminal coupled to said first $(M/N)f_{sc}$ signal input terminal of said sync generator.

23. The combination of claim 20 wherein one of said plurality of sync generator input terminals is adapted to be coupled to an external source of composite sync signals and another one of said plurality of sync generator input terminals is adapted to be coupled to an external source of composite blanking signals.

24. The combination of claim 20 wherein said output phase lock loop unit includes means for generating an internal reference signal train, a first phase comparator means coupled to said first input terminal and the output of said internal reference signal train generating means, means having an input coupled to the output of said first phase comparator means for generating a first set of output clock reference signals having a frequency dependent upon the output signal from said first phase comparator means, a second phase comparator means coupled to said second input terminal and said third input terminal, means having an input coupled to the output of said second phase comparator means for generating a second set of output clock reference signals having a frequency dependent upon the output signal from said second phase comparator means;

said control means includes switch means having first and second transfer inputs coupled respectively to the output of said means for generating said first and second sets of output clock reference signals and a control element coupled to said first selector means; and said $(M/N)f_{sc}$ signal generating means includes multiplier means having an input coupled to the output of said means for generating said second set of output clock reference signals for generating $(M/N)f_{sc}$ reference signal train from the signals input thereto.

25. The combination of claim 24 wherein said output phase lock loop unit further includes a bandwidth filter having at least two operating bandwidth ranges an a control element for selecting either one of said at least two operating bandwidth ranges in response to a range control signal, an input terminal coupled to the output of said second phase comparator means and an output terminal coupled to the input of said means for generating said second set of output clock reference signals; and a lock detector means having an input coupled to the output of said second phase comparator means and an output coupled to said control element for controlling the bandwidth of said bandwidth filter.

26. The combination of claim 20 wherein said subcarrier processor includes an $f'_{sc}$ signal output terminal;

switch means having a pair of transfer input terminals coupled respectively to said first and second subcarrier processor input terminals and an output terminal;

a first adjustable phase shifter having an input terminal coupled to the output of said subcarrier processor switch means and an output terminal for furnishing said $f_{sc}$ signals to said output phase lock loop; and a second adjustable phase shifter having an input terminal coupled to the output of said first adjustable phase shifter and an output coupled to said $f'_{sc}$ signal output terminal for furnishing $f'_{sc}$ signals thereto.

27. A method of processing video information signals to reduce time base errors, said method comprising the steps of:

a. generating a first clock signal train having a variable rate determined by the frequency of first predetermined portions of said video signals;

b. generating a second clock signal train having a variable rate determined by the frequency of second predetermined portions of said video signals, said second predetermined portions having a frequency range substantially less than the frequency range of said first predetermined portions;

c. sampling said video signals at intervals defined by said first clock signal train;

d. temporarily storing said sampled signals at said intervals defined by said first block signal train; and e. fetching said stored signals at intervals defined by said second clock signal train.

28. The method of claim 27 wherein said step (c) of sampling includes the step of converting said video signals to digital form, and further including the step of (f) reconverting said fetched signals to analog form.

29. The method of claim 27 wherein said step (a) of generating, a first clock signal train includes the steps of:

i. generating a reference signal train at a predetermined frequency;

ii. comparing the phase of said reference signal train to said first predetermined portions of said video signals;

iii. generating a control signal indicative of phase differences between said reference signal train and said first predetermined portions; and iv. altering said variable rate of said first clock signal train and said predetermined frequency of said reference signal train to compensate for said phase differences.

30. The method of claim 27 wherein said step (a) of generating a first clock signal train includes the steps of:

i. generating a first reference signal train having a first predetermined frequency;

ii. comparing the phase of said first reference signal train with successively appearing horizontal sync and alternate equalizer pulse portions of said video signals;

iii. producing a first control signal indicative of the phase difference between said first reference signal train and successive ones of said horizontal sync and alternate equalizer pulse portions; and iv. altering said variable rate of said first clock signal train and said first predetermined frequency in accordance with said control signals to compensate for said phase difference.

31. The method of claim 27 wherein said step (b) of generating a second clock signal train includes the steps of:

i. generating a reference signal train at a predetermined frequency;

ii. comparing the phase of said reference signal train to said second predetermined portions of said video signals;

iii. generating a control signal indicative of phase differences between said reference signal train and said second predetermined portions; and iv. altering said variable rate of said second clock signal train and said predetermined frequency of said reference signal train to compensate for said phase differences.

32. The method of claim 27 wherein said step (b) of generating a second clock signal train includes the steps of:

i. generating a second reference signal train having a second predetermined frequency;

ii. comparing the phase of said second reference signal train with successively appearing vertical sync pulse portions of said video signals;

iii. producing a second control signal indicative of the phase difference between said second reference signal train and successive ones of said vertical sync pulse portions; and iv. altering said variable rate of said second clock signal train and said second predetermined frequency in accordance with said control signals to compensate for said phase difference.

33. The method of claim 28 wherein said step (f) of reconverting includes the step of:

i. performing a digital-to-analog conversion of said digital signals;

ii. decoding the chroma portion of said video signals with a color subcarrier signal train derived from successive burst portions of said video color signals; and iii. re-encoding said decoded signals with a different color subcarrier signal train.

34. The method of claim 33 wherein the step of re-encoding includes the step of generating a color subcarrier signal train having a frequency substantially equal to $f_c$, where $f_c$ is the color frequency standard.

35. The method of claim 33 wherein said step of re-encoding includes the step of generating a color subcarrier signal train having a variable frequency $f$ determined by the variable rate of said second clock signal train.

36. The method of claim 33 wherein said step of reconverting further includes the steps of:

iv. supplying composite sync, burst flag and composite blanking signals; and v. combining the signals from step (iv) with said signals from step (iii).

37. The method of claim 36 wherein said step of supplying includes the step of generating standard composite sync, burst flag and composite blanking signals.

38. The method of claim 36 wherein said step of supplying includes the step of generating composite sync, burst flag, and composite blanking signals having individual variable frequencies determined by the variable rate of said second clock signal train.

39. A method of processing processed color video information signals supplied from a capstan servo recorder synchronized with a sync generator to reduce time base errors and convert the processed color signals to direct color signals, said method comprising the steps of:

a. generating a first clock signal train having a variable rate in accordance with said time base errors;

b. generating a second clock signal train having a fixed rate synchronized to said sync generator;

c. sampling said video signals at intervals defined by said first clock signal train;

d. temporarily storing said sampled signals at said intervals defined by said first clock signal train;

e. fetching said stored signals at intervals defined by said second clock signal train; and f. reconverting said fetched signals to analog form.

40. A method of processing processed color video information signals supplied by a non-capstan servo recorder to reduce time base errors and convert said processed color video information signals to quasi-direct color video signals having properly phased color components, said method comprising the steps of:

a. generating a first clock signal train having a variable rate determined by the frequency of first predetermined portion of said video signals;

b. generating a second clock signal train having a variable rate determined by the frequency of second predetermined portions of said video signals, said second predetermined portions having a frequency range substantially less than the frequency range of said first predetermined portions;

c. sampling said video signals at intervals defined by said first clock signal train;

d. temporarily storing said sampled signals at said intervals defined by first clock signal train;

e. fetching said stored signals at intervals defined by said second clock signal train;

f. reconverting said fetched signals to analog form;

g. demodulating the chroma portion of said reconverted signals with a color subcarrier signal train derived from successively appearing burst portions of said video signals;

h. re-encoding said decoded signals with a color subcarrier signal train having a variable frequency $f$ dependent upon said variable rate of said second clock signal train; and j. combining said re-encoded chroma signals with the luminance portion of said reconverted signals.

41. The method of claim 40 wherein said step (a) of generating a first clock signal train includes the steps of:

i. generating a reference signal train at a predetermined frequency;

ii. comparing the phase of said reference signal train to said first predetermined portions of said video signals;

iii. generating a control signal indicative of phase differences between said reference signal train and said first predetermined portions; and iv. altering said variable rate of said first clock signal train and said predetermined frequency of said reference signal train to compensate for said phase differences.

42. The method of claim 41 wherein said first predetermined portions are successively appearing horizontal sync and alternate equalizer pulse portions of said video signals.

43. The method of claim 40 wherein step (b) of generating a second clock signal train includes the steps of:

i. generating a second reference signal train having a second predetermined frequency;

ii. comparing the phase of said second reference signal train with successively appearing vertical sync pulse portions of said video signals;

iii. producing a second control signal indicative of the phase difference between said second reference signal train and successive ones of said vertical sync pulse iv. altering said variable rate of said second clock signal train and said second predetermined frequency in accordance with said control signals to compensate for said phase difference.

44. The method of claim 43 wherein said first predetermined portions are successively appearing horizontal sync and alternate equalizer pulse portions of said video signals, and wherein said second predetermined portions are successively appearing vertical sync pulse portions of said video signals.

45. The method of claim 40 further including the steps of:

k. generating composite sync and composite blanking signals having individual variable frequencies determined by the variable rate of said second clock signal train;

l. synchronizing a video signal recorder with said color subcarrier signal train and said composite sync and composite blanking signals; and m. recording said combined signals on the recording element of said video recorder.

46. The method of claim 45 further including the steps of:

n. synchronizing the operation of an additional video information signal source with said color subcarrier signal train and said composite sync and composite blanking signals;

o. mixing said combined signals with the video information signals supplied by said additional signal source before performing said step (m) of recording.

* * * * *

Notice of Adverse Decision in Interference

In Interference No. 99,675, involving Patent No. 3,900,885, M. W. Tallent, W. B. Hendershot, A. L. Swain, and R. M. Harrison, TELEVISION SIGNAL TIME BASE CORRECTOR, final judgment adverse to the patentees was rendered Apr. 6, 1979, as to claims 27 and 28.

[*Official Gazette September 4, 1979.*]